US012623499B2

(12) United States Patent
Lee, Jr. et al.

(10) Patent No.: US 12,623,499 B2
(45) Date of Patent: May 12, 2026

(54) TRAILER COUPLER LOCK WITH INTERCHANGEABLE ADAPTER

(71) Applicant: DYNAMIC MANUFACTURING GROUP LLC, Palmetto, FL (US)

(72) Inventors: Ronald Lee, Jr., Ruskin, FL (US); Anthony Sansone, Parrish, FL (US); Bradly Martin, Sarasota, FL (US)

( * ) Notice: Subject to any disclaimer, the term of this patent is extended or adjusted under 35 U.S.C. 154(b) by 369 days.

(21) Appl. No.: 18/465,104

(22) Filed: Sep. 11, 2023

(65) Prior Publication Data

US 2025/0083483 A1      Mar. 13, 2025

(51) Int. Cl.
B60D 1/60          (2006.01)

(52) U.S. Cl.
CPC ..................................... B60D 1/60 (2013.01)

(58) Field of Classification Search
CPC ....................................................... B60D 1/60
See application file for complete search history.

(56) References Cited

U.S. PATENT DOCUMENTS

| | | | |
|---|---|---|---|
| 3,780,546 A | 12/1973 | Longenecker | |
| 5,255,545 A * | 10/1993 | Wheeler | B62D 53/085 |
| | | | 280/507 |
| 7,040,646 B2 | 5/2006 | Andre | |

| | | | |
|---|---|---|---|
| 7,543,838 B2 * | 6/2009 | Jacques | B60D 1/60 |
| | | | 280/506 |
| 7,665,755 B2 * | 2/2010 | Thomsen | B60D 1/60 |
| | | | 280/507 |
| 8,020,885 B2 | 9/2011 | Cuellar et al. | |
| 9,649,900 B2 * | 5/2017 | Tsai | B60D 1/06 |
| 11,734,287 B2 | 8/2023 | Sharifi et al. | |
| 11,766,905 B2 * | 9/2023 | Cato | B60D 1/60 |
| | | | 280/507 |
| 2006/0163842 A1 * | 7/2006 | Jacques | B60D 1/60 |
| | | | 280/507 |
| 2020/0023698 A1 * | 1/2020 | Tsai | B60D 1/60 |
| 2025/0018754 A1 * | 1/2025 | Cato | B60D 1/28 |
| 2025/0313286 A1 * | 10/2025 | Lee, Jr. | B62D 53/10 |
| 2025/0319731 A1 * | 10/2025 | Glenn | B60D 1/04 |

* cited by examiner

*Primary Examiner* — Kevin Hurley
(74) *Attorney, Agent, or Firm* — Mark Young, PA; Mark J. Young

(57)          ABSTRACT

A trailer coupler lock includes a shell, a coupler engagement plug, a locking mechanism and an adapter. The shell includes a cove configured to receive a receptacle of a trailer coupler, a plug channel in which a plug moves linearly from extended position to a retracted position, and a lock channel in which a locking mechanism is movable from a locked position to an unlocked position. In the locked position, the locking mechanism engages and secures the plug in an extended position with a portion of the plug extending from the channel into the cove. The cove includes a slot in which an interchangeable adapter is removably received. The adapter defines a slot for receiving a portion of a trailer coupler, e.g., the flange at and around the coupler receptacle.

20 Claims, 22 Drawing Sheets

TRAILER COUPLER LOCK WITH INTERCHANGEABLE ADAPTER

FIELD OF THE INVENTION

This invention relates generally to trailer coupler locks, and, more particularly, to a lock with an interchangeable adapter.

BACKGROUND OF THE INVENTION

Conventional locks for trailer couplers are well known and have been in use for a number of years. Many such locks include a housing (aka shell) with a cavity for receiving at least a portion of the receptacle of a trailer coupler, an engaging element that is removably received in the receptacle of the coupler, and a mechanism for locking the engaging element to the shell while the receptacle of the trailer coupler is received in the cavity of the shell and the engaging element is received in the receptacle of the coupler.

Most conventional locks are configured to provide a set determined protection. First, such locks typically fit one or a very limited range of trailer couplers. Second, such locks offer no variation in the scope of protection. In other words, such locks lack components that can easily be upgraded for additional coverage and/or strength. Third, such locks do not provide weight savings, without materially compromising protection. A solid steel shell is heavy and costly to manufacture. A solid aluminum shell would be considerably lighter, but would provide less security than a steel counterpart. Fourth, such locks do not provide an interchangeable observable component that can be customized, such as with a team logo or other ornamental indicia.

A lock that enables adaptation to protect a range of couplers is needed. A lock that enables use of materials for heightened protection, while providing a shell that is relatively lightweight, is needed. A lock that can be adapted to offer a range of protections, from merely engaging a flange of a coupler to covering the receptacle of the coupler, is needed. A lock with an interchangeable observable component that can be customized is needed.

The invention is directed to overcoming one or more of the problems and solving one or more of the needs as set forth above.

SUMMARY OF THE INVENTION

To solve one or more of the problems set forth above, in an exemplary implementation of the invention, a coupler lock with an interchangeable adapter includes a shell. The shell includes a front, a back, a bottom and a top. A cove is formed in the back of the shell. The cove includes a concave recess into which a receptacle portion of a coupler may be received. An adapter engagement slot is formed in the back of the shell at the cove. A first channel extends from the bottom of the shell to the cove.

An adapter is removably received in the adapter engagement slot. The adapter includes a base with a hole that aligns with the first channel when the adapter is received in the engagement slot. A coupler flange engagement slot is formed in the adapter.

A receptacle engaging device is movable in the first channel (e.g., a vertical channel) from an unlocked position to a locked position. In the locked position a portion of the receptacle engaging device extends through the hole in the base of the adapter into the cove. In the unlocked position the receptacle engaging device does not extend into the hole in the base of the adapter and does not extend into the cove.

The cove includes a sidewall. The adapter engagement slot includes a first groove formed in the sidewall of the cove. The first groove is configured to engage at least a portion of the adapter (e.g., a portion at a periphery of the adapter, but not including the back of the adapter).

The cove has a bottom surface. The base of the adapter abuts the bottom surface of the cove when the adapter is received in the adapter engagement slot. Optionally, a mechanical fastener secures the base of the adapter to the bottom of the cove.

The base of the adapter includes a front portion, a rear portion and a pair of spaced apart edges (e.g., spaced apart parallel edges) extending from the front portion to the rear portion. The front is the part of the adapter that enters the adapter engagement slot first. The back is the opposite side of the adapter. The adapter further includes a sidewall extending from the front portion and the pair of spaced apart edges. A flange extends orthogonally from the sidewall. The flange, sidewall and base of the adapter define the coupler flange engagement slot. The front portion of the adapter may be arch-shaped. A distance from the flange and base of the adapter is at least equal to a thickness of a coupler flange, to allow the coupler flange to be received in the space defined therebetween.

In one embodiment, the base of the adapter includes an elevated portion adjacent to the front portion of the base of the adapter, an unelevated portion adjacent to the back portion of the base of the adapter, and a ramp portion transitioning from the unelevated portion to the elevated portion. The distance from the flange and the elevated portion of the base of the adapter is at least equal to a thickness of a coupler flange.

The first channel has a first diameter. The hole in the base of the adapter has a diameter that is at least equal to (not less than) the first diameter. The first channel and the hole in the base of the adapter are concentrically aligned.

In one embodiment, the shell is comprised of a first material and the adapter is comprised of a second material that may be different from the first material. A density of the second material may be greater than a density of the first material. A hardness of the second material may be greater than a hardness of the first material.

The receptacle engaging device may be a plug having a cylindrical body with an elongated slot formed in a sidewall of the cylindrical body. The longitudinal axis of the cylindrical body may be parallel to the longitudinal axis of the slot. The elongated slot of the cylindrical body includes a top end and a bottom end, with a cavity formed in the elongated slot of the cylindrical body at the bottom end of the elongated slot of the cylindrical body. A lock channel extends from the front of the shell to the first channel, intersecting the first channel. A lock assembly is movable in the lock channel from an unlocked configuration to a locked configuration. In the locked configuration, a portion of the lock assembly engages the cavity formed in the elongated slot of the cylindrical body at the bottom end of the elongated slot of the cylindrical body and retains the receptacle engaging device in the locked position. In the unlocked configuration the portion of the lock assembly engages the elongated slot of the cylindrical body without engaging the cavity formed in the elongated slot of the cylindrical body at the bottom end of the elongated slot. Then, the receptacle engaging device is movable relative to the first channel. An annular groove may intersect the lock channel. The lock assembly includes a lug movable from a recessed position to an extended position. In the extended position the lug extends into the annular groove, and in the recessed position the lug does not extend into the annular groove.

In one embodiment, the exterior surface of the shell may include a plurality of weight saving and security enhancing hexagonal prism bosses with a distance between opposite corners of each hexagonal prism boss not exceeding 3 inches.

BRIEF DESCRIPTION OF THE DRAWINGS

The foregoing and other aspects, objects, features and advantages of the invention will become better understood with reference to the following description, appended claims, and accompanying drawings, where:

The figures are not intended to be drawn to any particular scale. The figures are not intended to illustrate every embodiment of the invention. The invention is not limited to the exemplary embodiments depicted in the figures or to the specific components, configurations, shapes, relative sizes, ornamental aspects or proportions as shown in the figures.

DETAILED DESCRIPTION

A trailer coupler lock according to principles of the invention includes a shell, a coupler engagement plug, a locking mechanism and an adapter. The shell includes a cove that is sized and configured to receive a receptacle of a trailer coupler. The shell includes a plug channel in which the plug is received. The plug moves linearly within the plug channel from a locked position to an unlocked position. In the locked position, a portion of the plug extends from the channel into the cove. The shell includes a lock channel in which the locking mechanism is received. The locking mechanism is movable from a locked position to an unlocked position. In the locked position, the locking mechanism engages and secures the plug in a fixed, extended position.

The adapter is a protective core received in the shell. The cove of the shell includes a slot in which the adapter is received. The adapter receives a portion of a trailer coupler. The adapter is removable and interchangeable. A trailer coupler lock according to principles of the invention may be equipped with an adapter from a plurality of adapters. An adapter may be selected to engage a particular coupler. Adapters of various configurations and sizes may be received in the slot. An adapter of a size and configuration suitable for engaging a particular coupler may be chosen. Different adapters may be comprised of different materials to offer a range of levels of protection at a range of costs. An adapter comprised of a high strength high density material may be used with a shell of a lower density material to provide enhanced security at reduced weight and cost.

Figure 1:
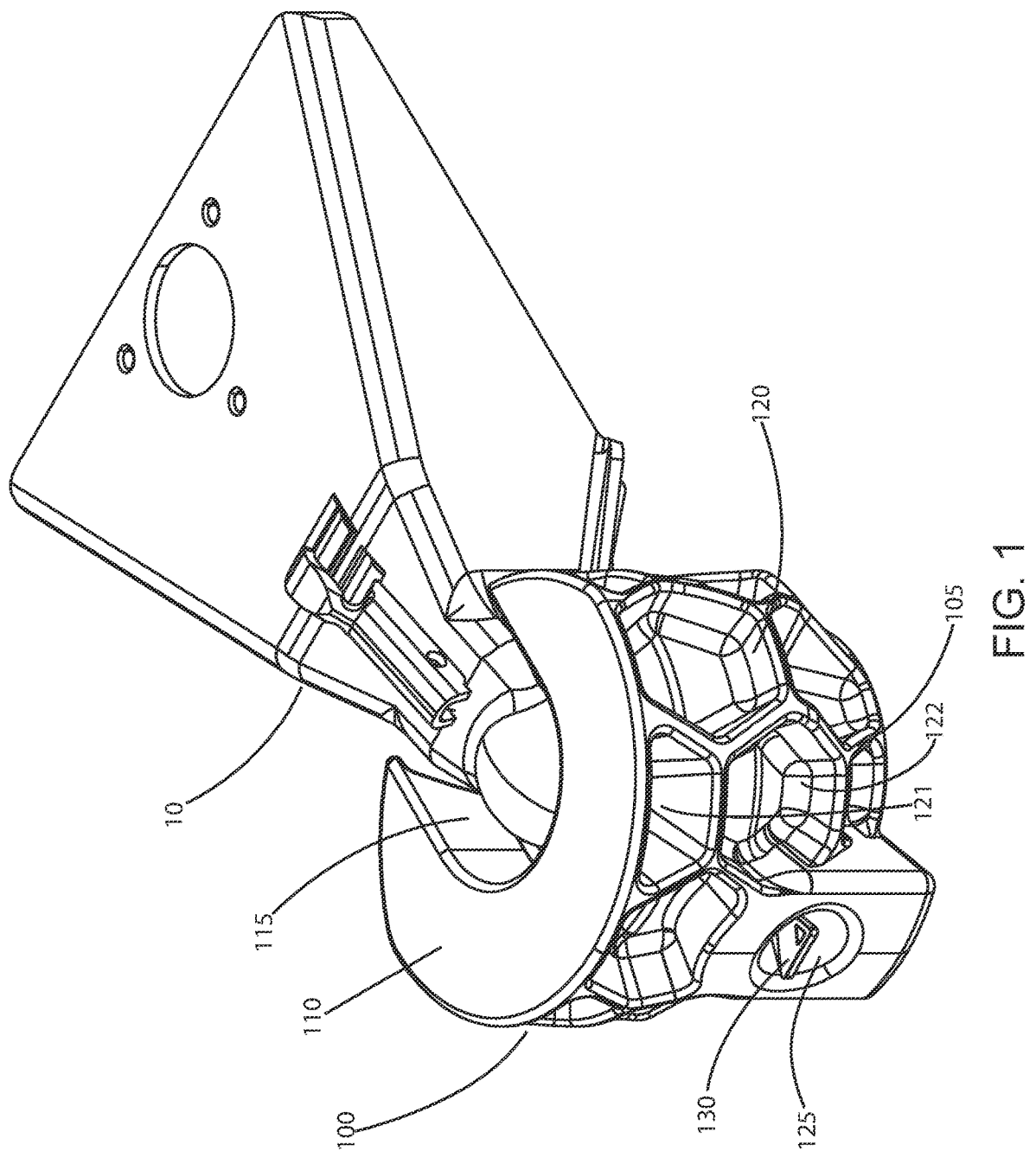
FIG. 1 is a perspective view of an exemplary coupler lock with an interchangeable adapter installed on an A-frame trailer coupler in accordance with principles of the invention.

FIG. 1 is a perspective view of an exemplary coupler lock 100 with an interchangeable adapter installed on an A-frame trailer coupler 10 in accordance with principles of the invention. The A-frame trailer coupler 10 is an example of a ball and socket coupler that connects a trailer to a towing vehicle. The invention is not limited to use with an A-frame coupler. A coupler lock according to principles of the invention may be used with other couplers having receptacles for engaging a towing ball.

The exemplary coupler lock 100 includes a shell 105. The shell 105 is a solid housing with channels and other structure for containing components. The shell 105 includes a cove 115, e.g., a concave recess, into which the receptacle portion 20 of the coupler 10 is received. In the exemplary embodiment of FIG. 1, the cove 115 is open at the top and closed at the bottom, as shown in FIGS. 4-6 and 11-12. A cove 115 that is closed (i.e., covered) at the top and bottom is within the scope of the invention.

The shell 105 is comprised of a metal (e.g., a metal alloy), such as a steel or aluminum alloy. The shell may be formed by casting and/or machining. The shell may comprise a solid integrally formed structure. The shell may also be made from nonmetallic materials, such as composites.

The exterior sidewall of the exemplary shell 105 includes a plurality of contiguous hexagonal bosses 120 (hexagonal prismatic cells) forming a honeycomb pattern. The bosses 120 save material and weight. If the cells were filled, the weight of the shell 105 would be appreciably greater. A cast shell 105 would require appreciably more metal, at greater cost. Shipping costs would be higher. Manipulating the lock 100 for use on a trailer would be more cumbersome.

Some bosses may not be hexagonal due to the position of the boss and the contour and size of the shell. For example, cell 121 is not hexagonal, because there is insufficient space between cell 122 and the top edge 110 for a complete hexagonal shell. Thus the cell 121 is truncated.

The distance between opposite corners of each hexagonal boss (including truncated hexagonal bosses) is not more than 3 inches, preferably 3 inches to 1 inch, and more preferably 2.75 to 2 inches, such as 2.5 inches. The depth of the cells (measured from the outermost edge of the boss to the back wall of the cell) may vary according to the contour of the shell 105 and the location of the boss. However, the average depth may be 1.5 inches to 0.25 inches, more preferably 1 inch to 0.5 inches. The depth may be viewed as a radial distance by which each boss extends from a core of the shell 105.

A thief may attempt to defeat a coupler lock with a portable angle grinder. The diameter of a common angle grinder disc is 4.5 inches. Thus, a typical angle grinder applied to the exterior sidewall of the lock 100 will encounter at least two projecting sides of a hexagonal boss, no matter how the angle grinder is oriented. Whether the angle grinder is oriented with the plane of the disc oriented vertically, horizontally, or at an angle relative thereto, the disc will encounter two projecting sides of the hexagonal boss. The projecting sides deter attack by an angle grinder.

The shell 105 includes a lock channel 125. The lock channel 125 receives a locking mechanism that is actuated using a key 130. The lock mechanism and internal structure of the lock channel are described in greater detail below.

Figure 2:
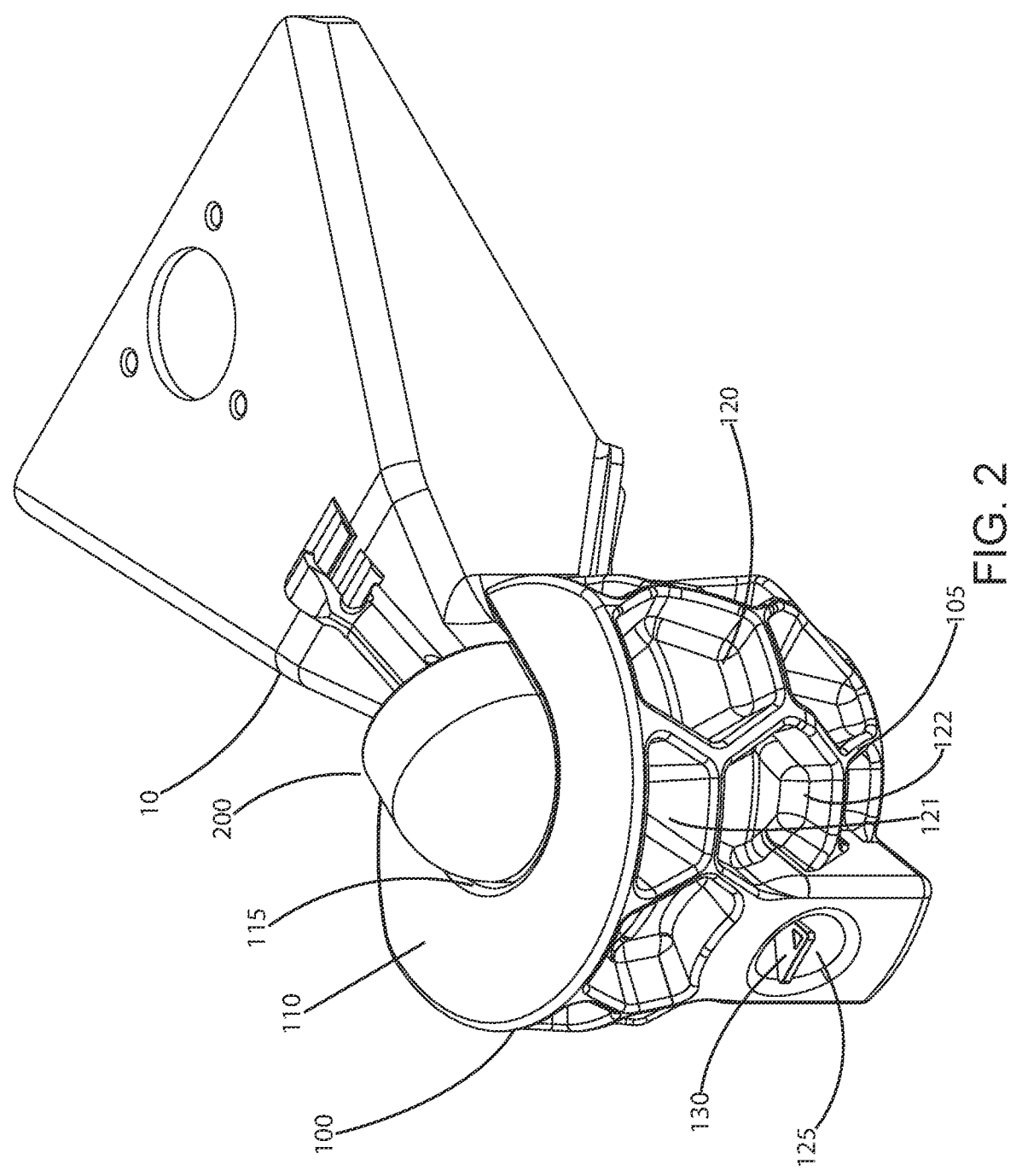
FIG. 2 is a perspective view of an exemplary coupler lock with another interchangeable adapter installed on an A-frame trailer coupler in accordance with principles of the invention.

FIG. 2 provides a perspective view of an exemplary coupler lock 100 with another interchangeable adapter 200 installed in accordance with principles of the invention. The adapter 200 shown in FIG. 2, includes a cover 230 (FIG. 9) that receives and envelops or overlays the receptacle portion 20 of the coupler 10. This adapter 200 is described in greater detail below.

Figure 3:
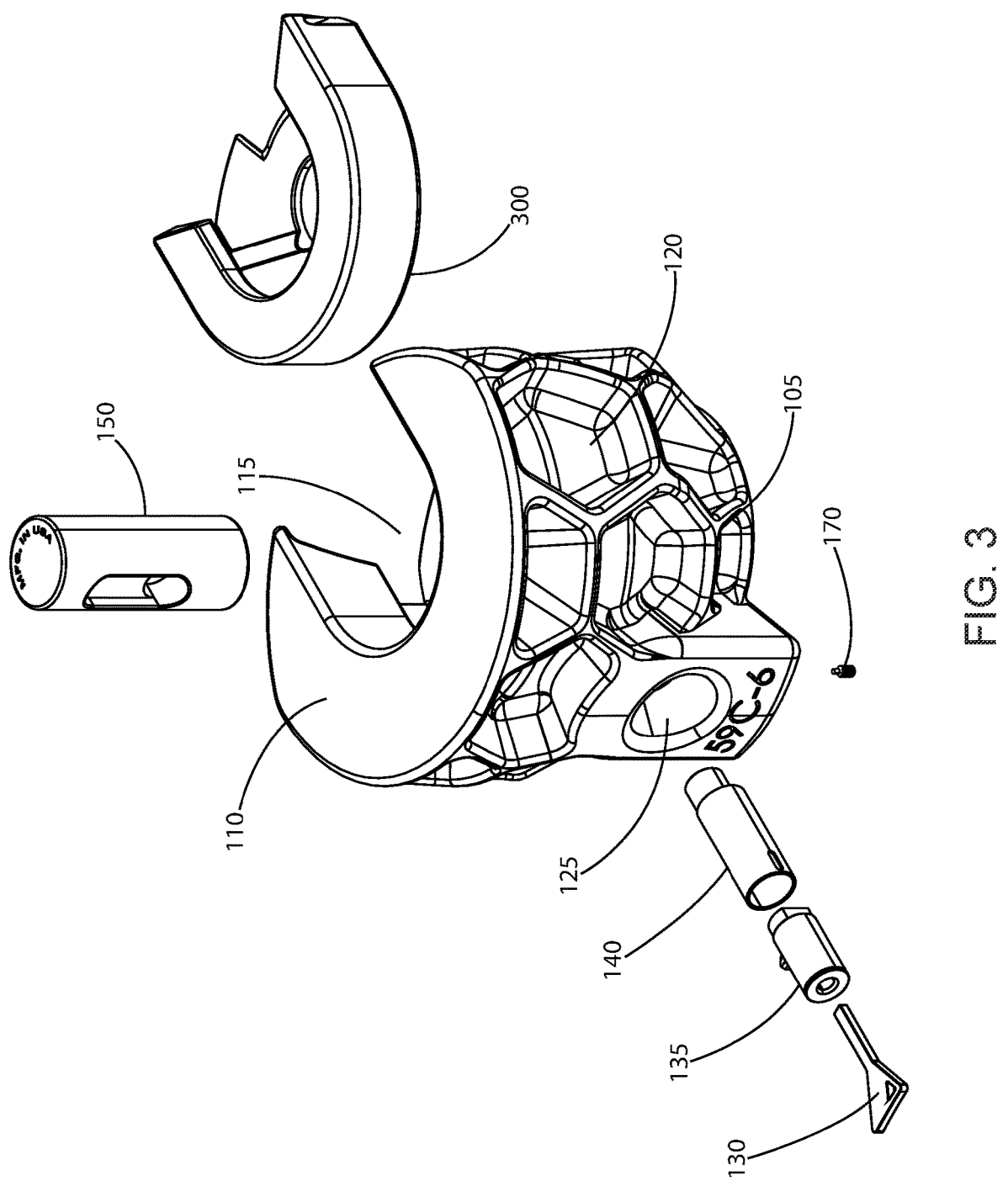
FIG. 3 is a first perspective exploded view of an exemplary coupler lock with an interchangeable adapter installed on an A-frame trailer coupler in accordance with principles of the invention.
Figure 4:
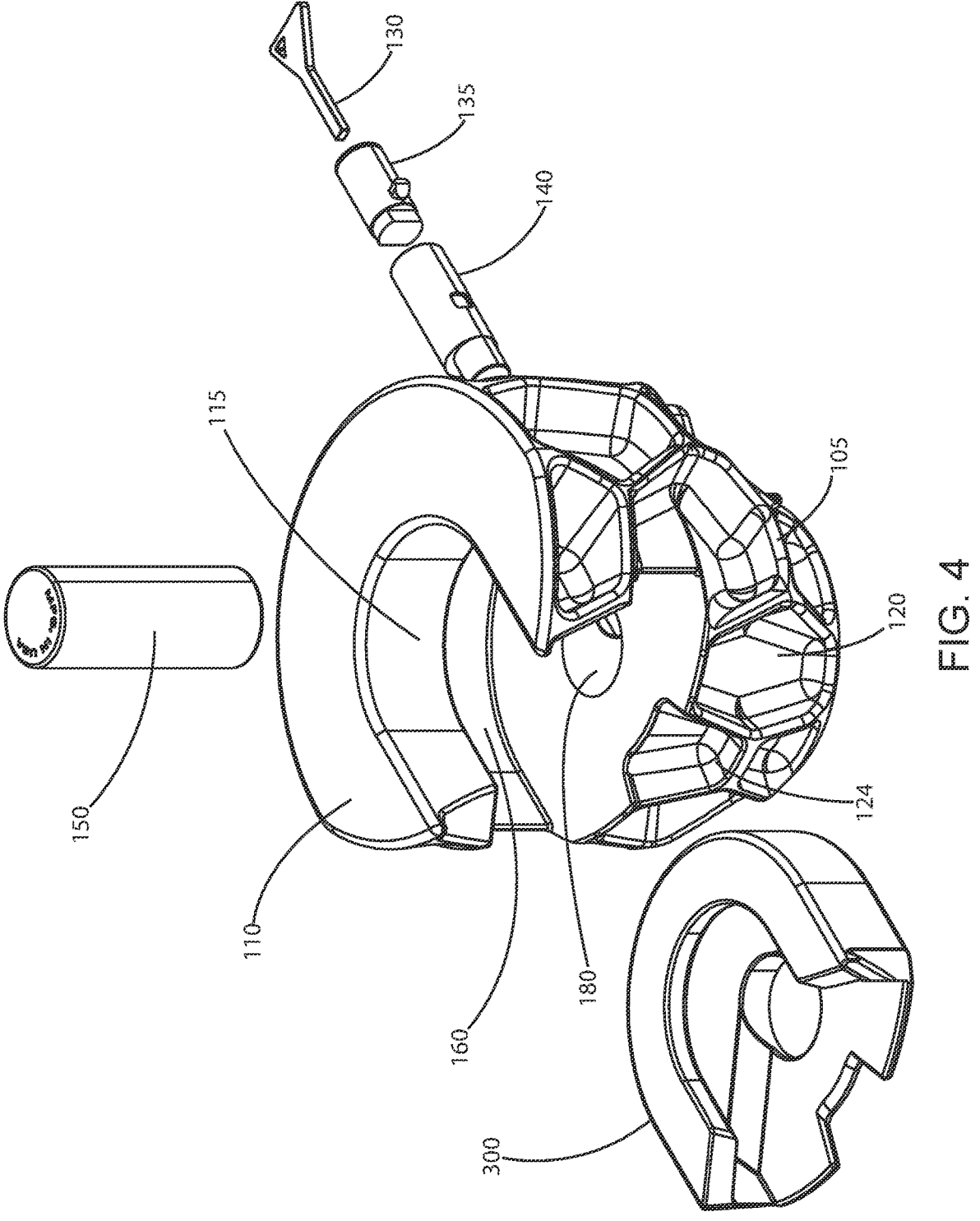
FIG. 4 is a second perspective exploded view of an exemplary coupler lock with an interchangeable adapter installed on an A-frame trailer coupler in accordance with principles of the invention.

FIGS. 3 and 4 provide perspective exploded views of the exemplary coupler lock 100 with an interchangeable adapter 300. The adapter 300 is different from the adapter shown in FIG. 2.

A lock assembly includes a key 130, a lock core 135 and a bolt mechanism 140. The bolt mechanism 140 receives the lock core 135. Together, the bolt mechanism 140 and lock core 135 constitute a locking mechanism. The locking mechanism is movable linearly within a lock channel 125. The lock channel 125 is formed in the shell 105. The lock channel 125 extends from the front of the lock 100 to a plug channel 180. The lock channel 125 intersects the plug channel 180. The locking mechanism is movable from a locked position to an unlocked position. The lock core 135 is configured to receive the key for locking and unlocking. A set screw 170 limits linear motion of the bolt mechanism 140, when the lock core 135 is unlocked. The lock core 135 and bolt mechanism 140 are described in detail below.

Figure 16:
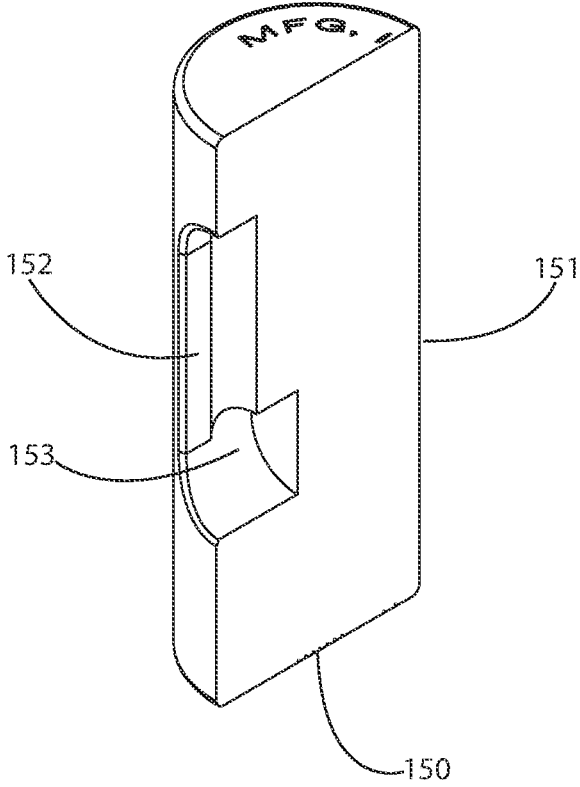
FIG. 16 is a perspective section view of an exemplary coupler engagement pin for an exemplary coupler lock in accordance with principles of the invention.

The shell 105 includes a plug channel 180 in which a plug 150 is received. The plug 150 moves linearly within the plug channel 180 from a protruding (extended) to a retracted position. In the retracted position, the plug 150 is contained entirely within the plug channel 180. In the extended position, a portion of the plug 150 extends from the plug channel 180 into the cove 115. As discussed above with reference to the lock assembly, the shell also includes a lock channel 125 in which the locking mechanism is received. The lock channel 125 intersects the plug channel. The locking mechanism is movable in the lock channel 125 from a locked position to an unlocked position. In the locked position, the locking mechanism engages and secures the plug 150 in an extended position. In the retracted position, the locking mechanism engages a slot 152 (FIG. 16) in the plug 150 that allows the plug 150 to descend, under the influence of gravity, to the retracted position. The plug 150 is located, configured, shaped, and sized to extend into the receptacle 20 of a coupler 10, when the plug 150 is in the extended position and the coupler 10 is engaged by the coupler lock 100.

Figure 5:
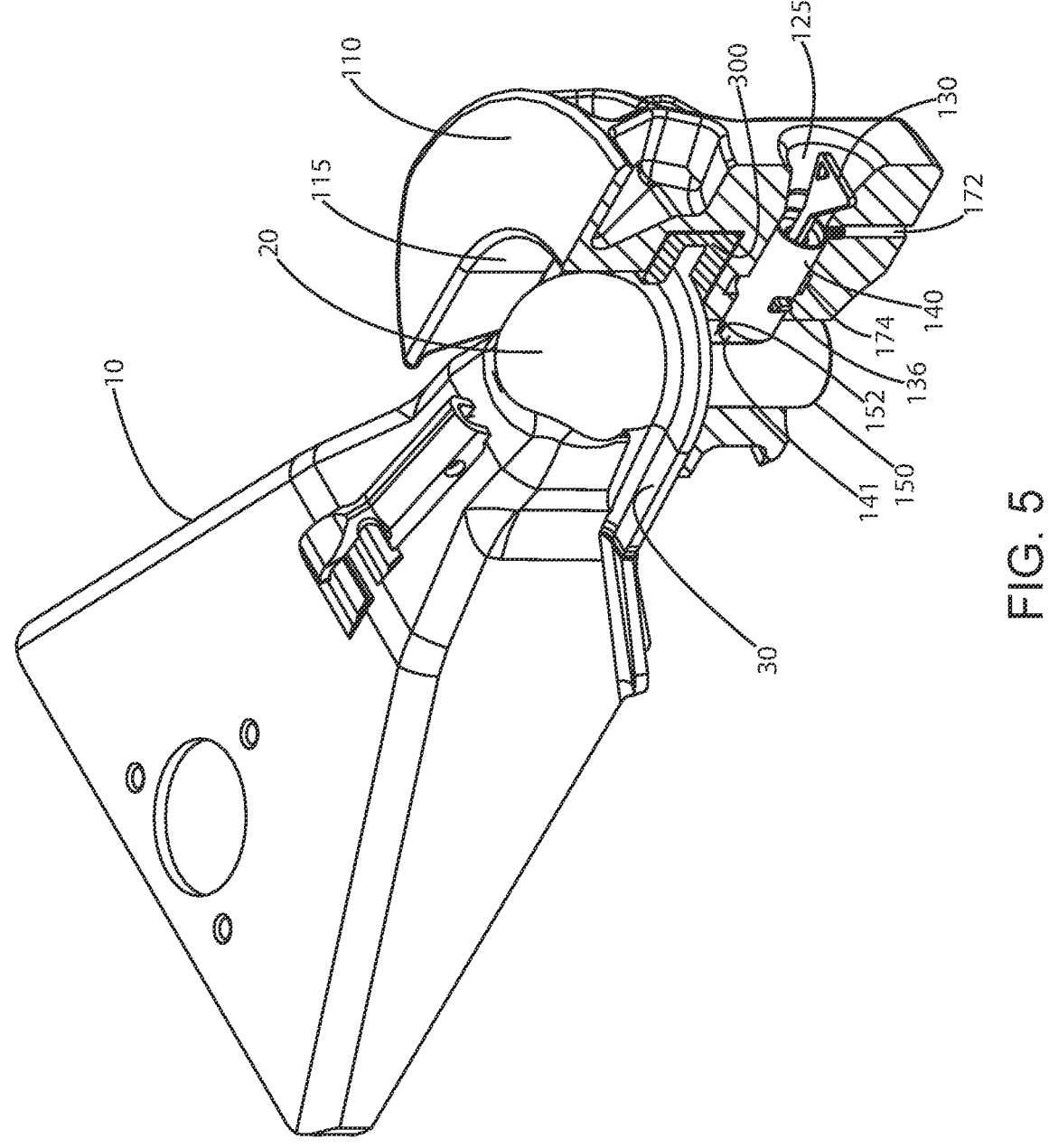
FIG. 5 is a perspective partially sectioned view of an exemplary coupler lock with an interchangeable adapter installed on an A-frame trailer coupler in accordance with principles of the invention.

FIG. 5 provides a perspective partially sectioned view of an exemplary coupler lock 100 with an interchangeable adapter 300 installed on an A-frame trailer coupler 10 in accordance with principles of the invention. The adapter 300 is received in a slot in the shell 105. The coupler 10 includes a receptacle 20 with a peripheral flange 30. At least a substantial portion of the peripheral flange 30 is received in the adapter 300. The adapter 300 is sized and shaped to receive and engage the flange 30 of a receptacle 20 of a coupler 10.

An adapter 300 may be configured for use with one or more couplers. Different adapters may be installed in the housing 105 to engage different couplers. Additionally, different adapters may be installed to provide different levels of protection. For example, the adapter 200 of FIG. 6, includes a cover 230 that receives and envelops the receptacle 20 of the coupler 10. Thus, in addition to engaging the flange 30, the adapter 200 covers the receptacle 20 to protect it from tampering.

Figure 6:
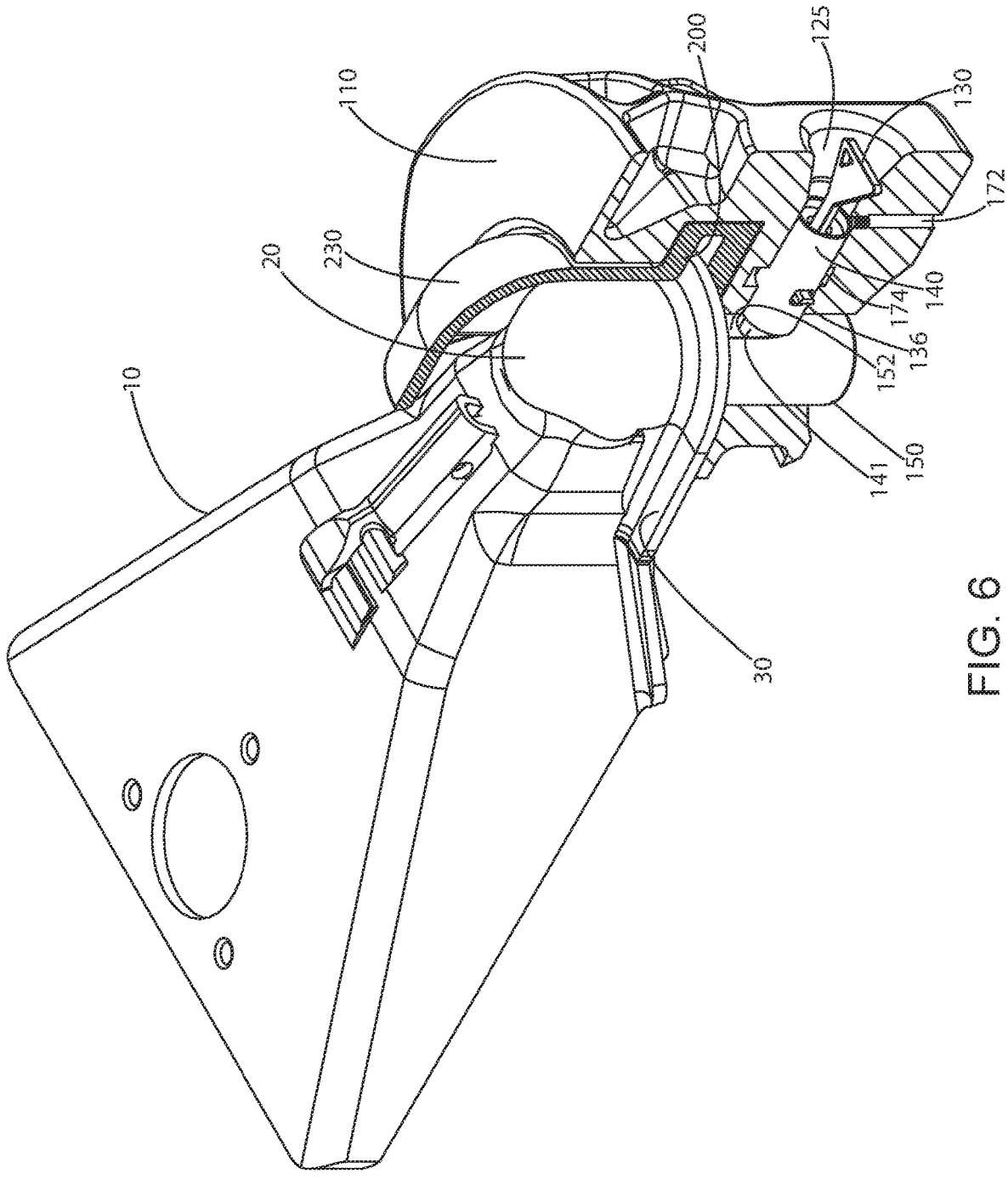
FIG. 6 is a perspective partially sectioned view of an exemplary coupler lock with another interchangeable adapter installed on an A-frame trailer coupler in accordance with principles of the invention.
Figure 13:
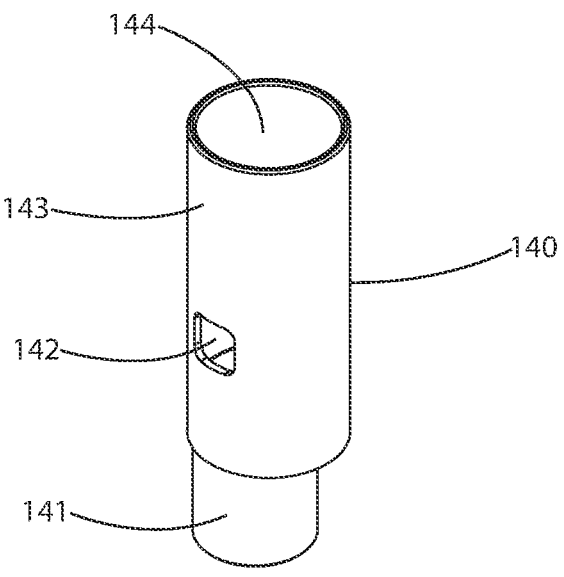
FIG. 13 is a first perspective view of an exemplary locking sleeve for an exemplary coupler lock in accordance with principles of the invention.
Figure 14:
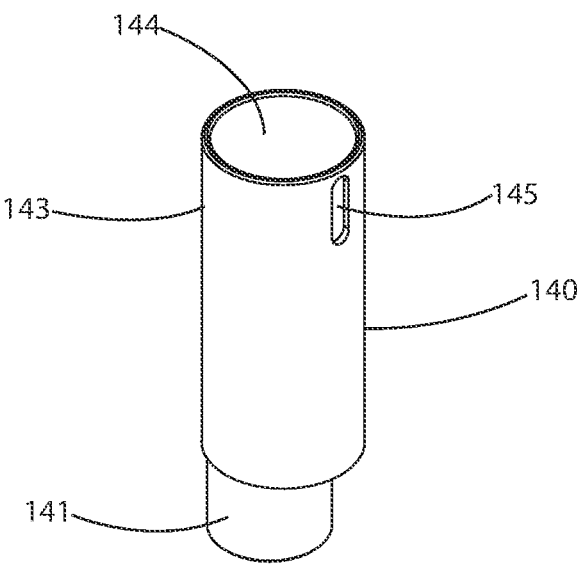
FIG. 14 is a second perspective view of an exemplary locking sleeve for an exemplary coupler lock in accordance with principles of the invention.
Figure 15:
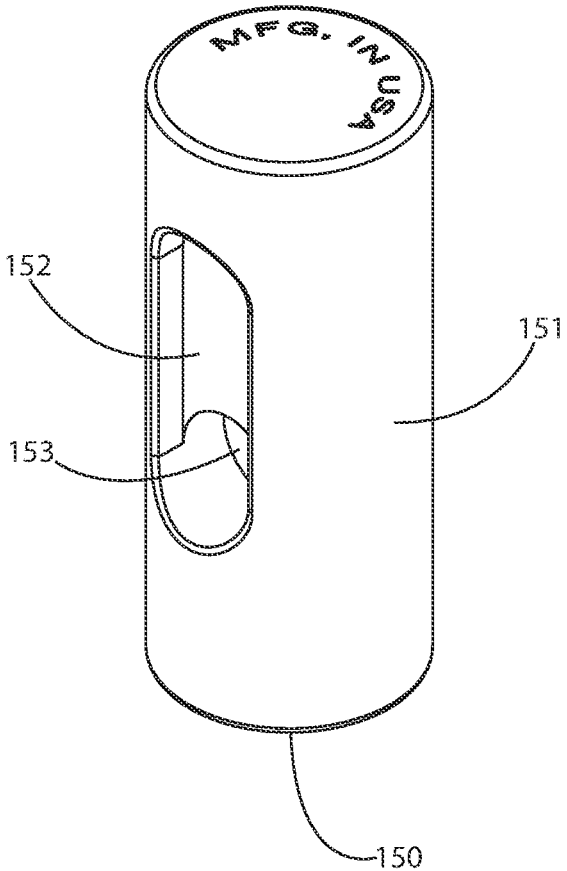
FIG. 15 is a perspective view of an exemplary coupler engagement pin for an exemplary coupler lock in accordance with principles of the invention.

FIGS. 5 and 6 also illustrate the plug 150 in the locked position. A cylindrical bolt 141 (FIGS. 13 and 14) of the bolt mechanism 140 extends into a similarly shaped and sized compartment 153 (FIGS. 15 and 16) of the plug 150. The bolt mechanism 140 includes a sleeve 143, which defines a cylindrical compartment 144. The lock core 135 is received in the cylindrical compartment 144. In the exemplary embodiment, the lock core 135 is a vending style lock. The lock core 135 includes a lug 136 that aligns with a window 142 in the sleeve 143. When locked, the lug 136 extends through the window 142. When unlocked, the lug 136 is about flush with the window 142. About flush means flush, proud by less than $1/16''$ or extending into the window without extending beyond the exterior surface of the sleeve 143. The sleeve 143 also includes a narrow peripheral fenestration 145 (e.g., a window or a groove). The fenestration 145 is elongated and located near the open end of sleeve 143. The length of the fenestration 145 is about equal to or slightly less than the length of the cylindrical bolt 141. The fenestration 145 is aligned with a threaded channel 172. A tip 161 of a set screw 170 in the threaded channel 172 extends into the fenestration 145, but does not exert force against the sleeve 143 (or the contained lock core 135) that would prevent linear movement of the bolt mechanism 140 (and the contained lock core 135) relative to the set screw 170. The length of the fenestration 145 allows linear motion of the bolt mechanism 140 (and the contained lock core 135) from an unlocked position to a locked position. In the locked position, the cylindrical bolt 141 extends into the compartment 153 (FIGS. 15 and 16) of the plug 150. In the unlocked position, the cylindrical bolt 141 is withdrawn from the compartment 153 of the plug 150.

In the exemplary embodiment, the plug 150 is a solid metal (e.g., steel) cylindrical structure. The plug 150 includes an elongated slot 152. The slot 152 is formed in the sidewall 151 of the plug. The longitudinal axis of the slot 152 is parallel to the longitudinal axis of the plug 150. The width of the slot 152 is at least equal to, and preferably slightly greater (e.g., greater by 1 to 5%) than, the diameter of the cylindrical bolt 141. The ends of the slot 152 are radiused, and, more specifically, semicircular in cross-section shape. Thus, the cylindrical bolt may move linearly within the slot 152. The compartment 153 is formed at one end of the slot 152. The diameter of the compartment 153 is at least equal to, and preferably slightly greater (e.g., greater by 1 to 5%) than, the diameter of the cylindrical bolt 141. The compartment 153 defines the extended position of the plug 150. In the extended position, when the compartment 153 aligns with and receives the cylindrical bolt 141, a portion of the plug 150 extends through the plug channel 180 into the cove 115 to be received by a coupler receptacle 20. When the cylindrical bolt 141 is removed from the lock compartment 153, the cylindrical bolt may remain within the slot 152 and the plug 150 may descend in the plug channel 180 until the cylindrical bolt 141 abuts the end of slot 152 opposite the end with the compartment. Then, in the retracted position, the plug 150 does not extend through the plug channel 180 into the cove 115.

FIGS. 7-10 provide nonlimiting examples of two interchangeable adapters for an exemplary coupler lock in accordance with principles of the invention. Each adapter is received in a slot 160 in the cove 115 of the shell 105. The adapter abuts the bottom surface 162 of the cove 115. The flange 30 of the coupler 10 is received in and engaged by the adapter.

Figure 7:
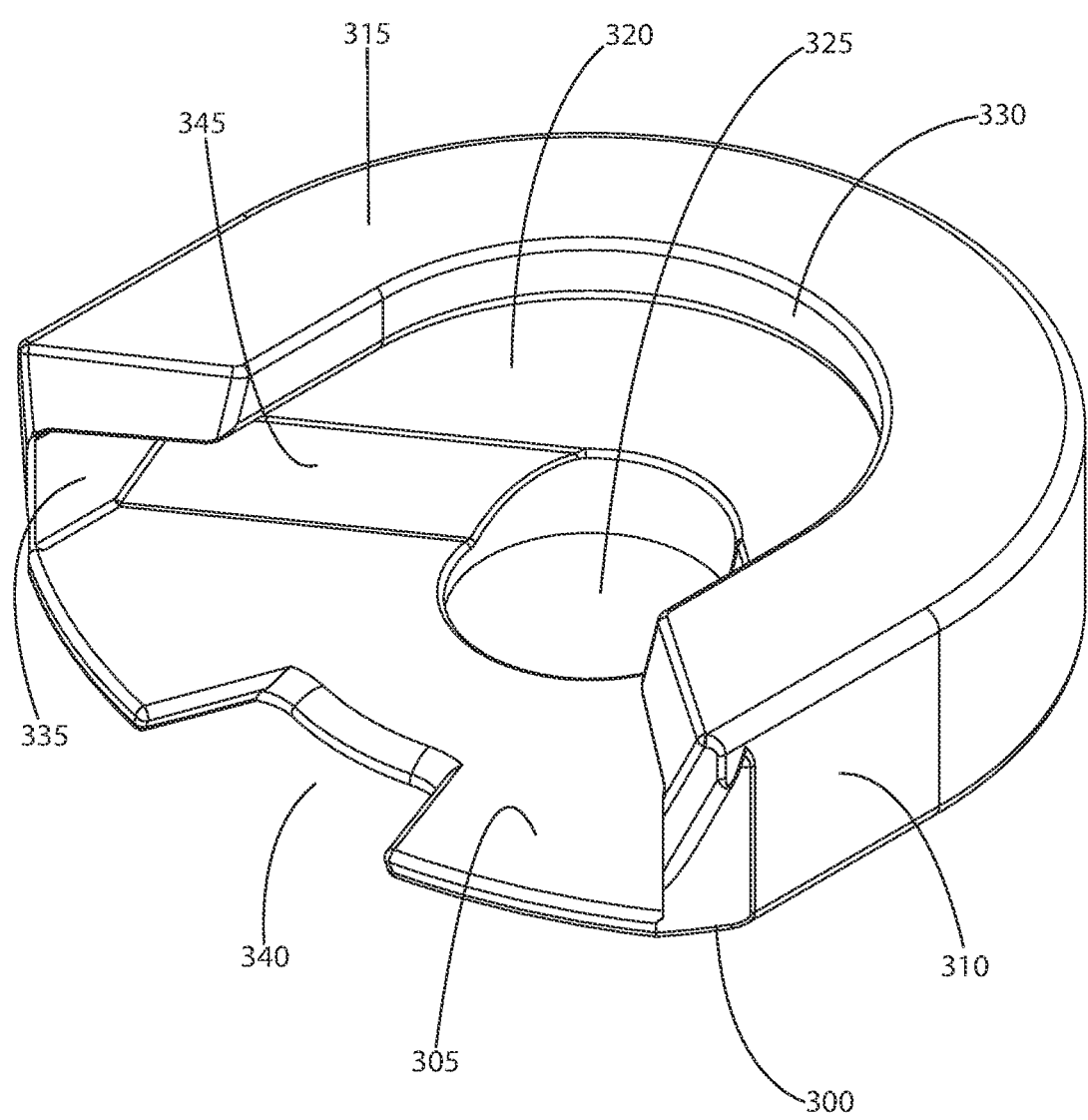
FIG. 7 is a perspective view of an exemplary interchangeable adapter for an exemplary coupler lock in accordance with principles of the invention.
Figure 8:
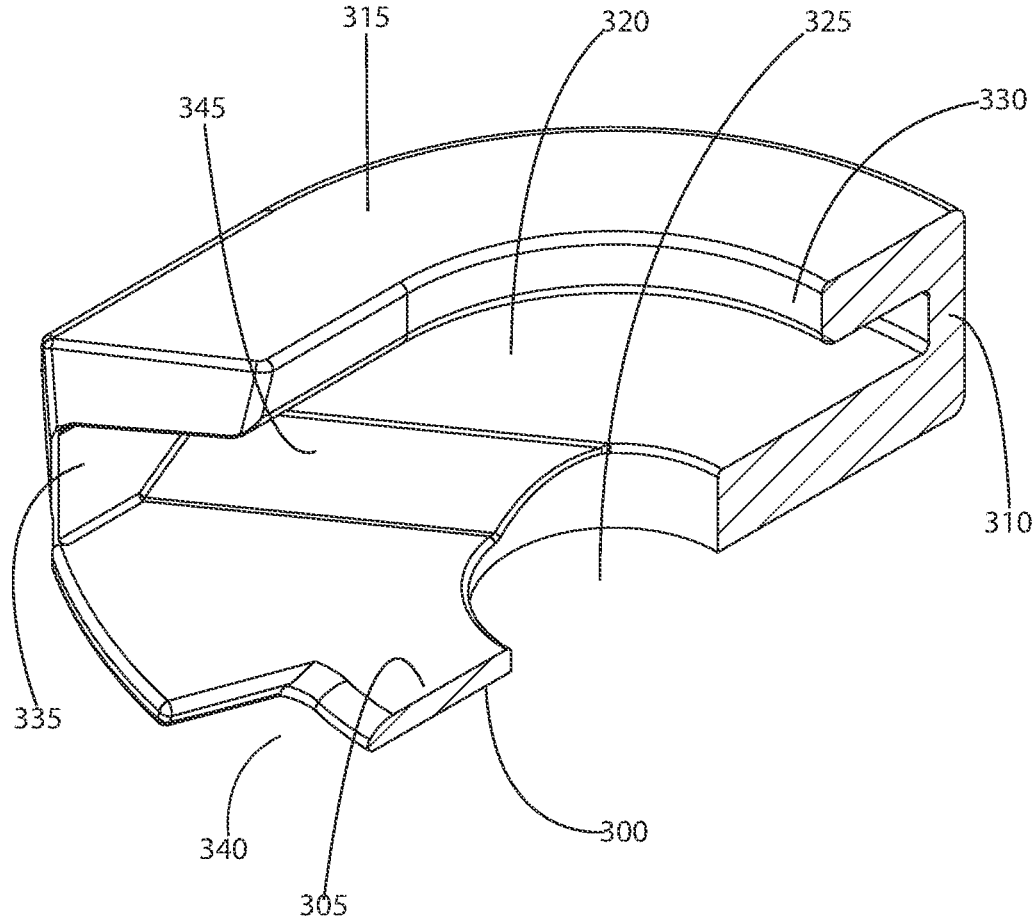
FIG. 8 is a perspective section view of an exemplary interchangeable adapter for an exemplary coupler lock in accordance with principles of the invention.

The adapter 300 conceptually illustrated in FIGS. 7-8 includes a base 305 which forms the bottom of the adapter 300. A ramp 345 extends to an elevated portion 320 of the base 305 towards the closed portion of the adapter 300. The ramp 345 facilitates guiding the flange 30 of a coupler 10 into the elevated portion 320 of the base 305 with reduced height. The elevated portion 320 narrows the slot 335 to more securely engage the flange 30 of a coupler 10.

A hole 325 extends through the base 305. The hole 325 aligns with the plug channel 180 when the adapter 300 is installed in the shell 105. The hole 325 is circular in cross section shape and has a diameter that is at least equal to the diameter of the channel 180. The plug 150 extends through the hole 325 when the plug 150 is in an extended position.

When the plug 150 is in a retracted position, the plug 150 does not extend into the hole 325.

A sidewall 310 extends upwardly from the peripheral edge of the base 305. The sidewall 310 generally forms the shape of a U. A flange 315 extends inwardly from the top of the sidewall 310. In a plan view, the flange 315 defines a U-shaped opening that is narrower than the U-shape formed by the sidewall 310. The base 305, sidewall 310 and flange 315 form the slot 335 in which the flange 30 of the coupler 10 is received.

A recess 340 is formed at the front edge of the adapter. The recess 340 is configured to conform with the underlying cell 124 (FIG. 4) of the shell. The base 305 does not extend past the outer edges of the bottom 162 of the cove 115. Without the recess, the base 205 would overhang the cell 124, posing a potential risk to prying. While any such prying effort would likely fail, it is best to eliminate or minimize overhangs that may seem vulnerable to prying.

The adapter 300 is sized and shaped to fit within a slot 160 of the shell 105. The slot 160 of the shell 105 is sized and shaped to securely receive the adapter 300. The bottom of the base 305 of the adapter 300 abuts the bottom 162 of the cove 115. The top of the flange 315 abuts the overhang 164. The hole 325 aligns with the plug channel 180.

The adapter 300 may be comprised of a material that is the same as or different from the material of the shell 105. The adapter 300 material may be comprised of a hardened and tempered steel alloy for superior theft protection. The shell may be comprised of a less costly steel or, to save weight, a lower density material such as an aluminum alloy or nonmetallic composites.

Figure 9:
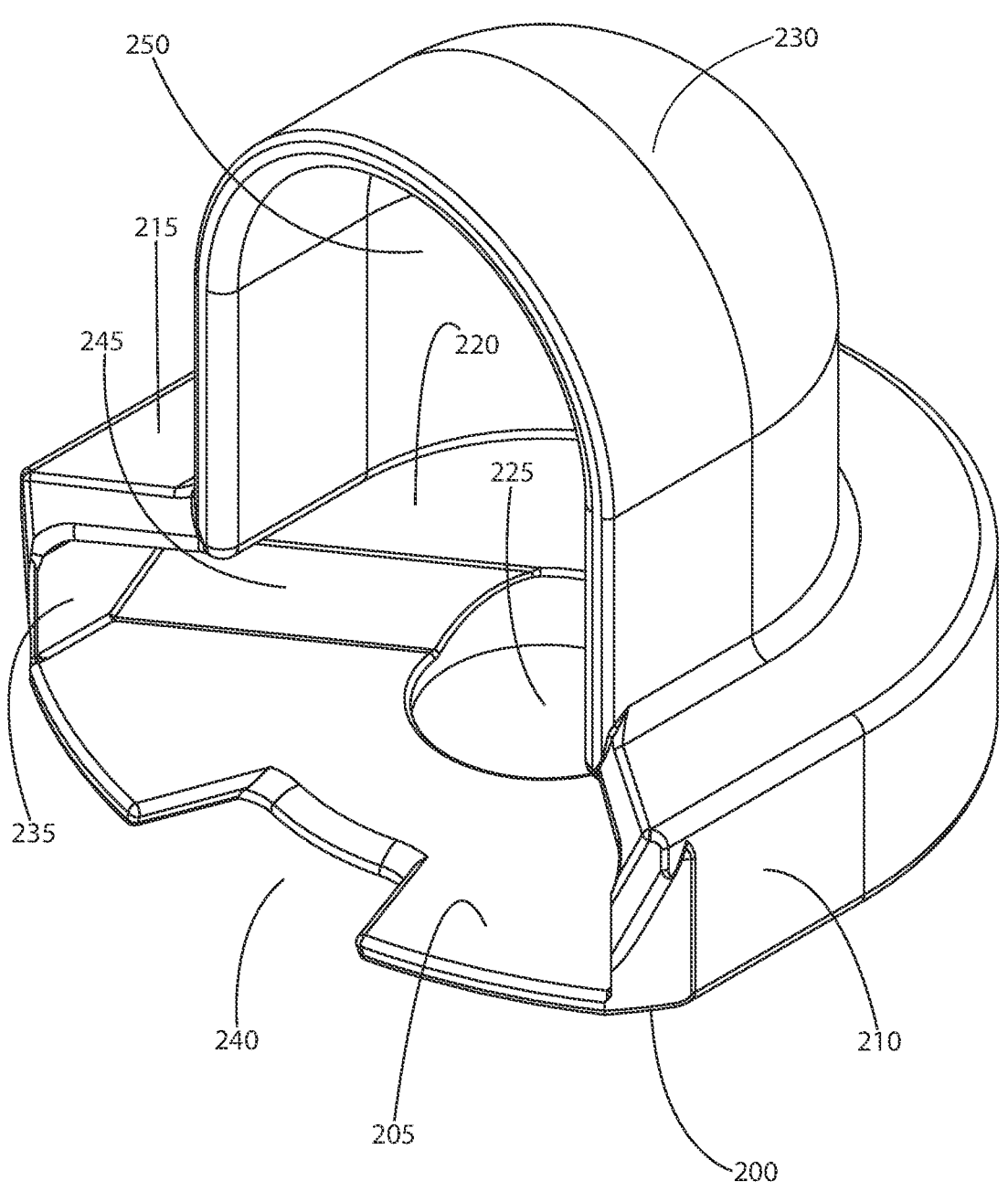
FIG. 9 is a perspective view of another exemplary interchangeable adapter for an exemplary coupler lock in accordance with principles of the invention.
Figure 10:
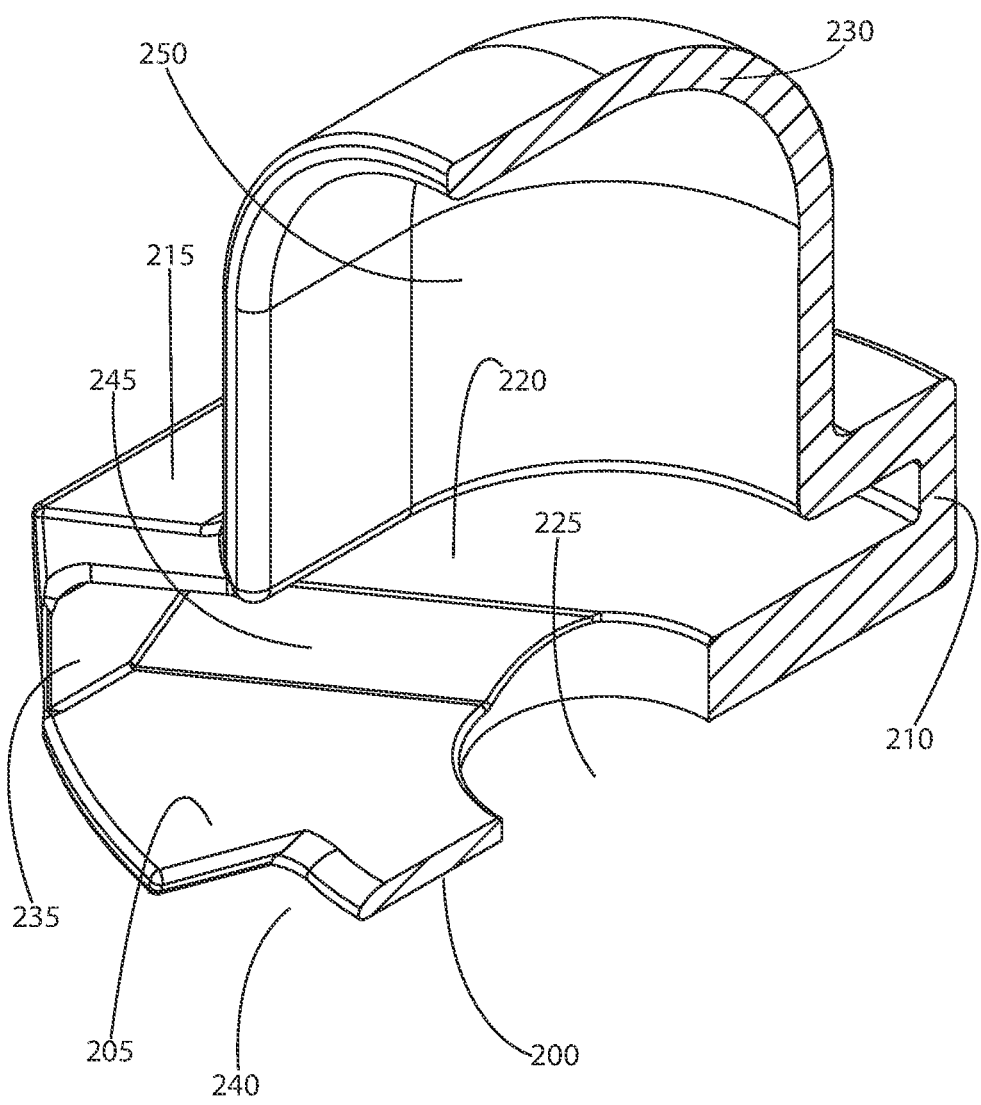
FIG. 10 is a perspective section view of another exemplary interchangeable adapter for an exemplary coupler lock in accordance with principles of the invention.

The adapter 200 conceptually illustrated in FIGS. 9-10 includes a base 205 which forms the bottom of the adapter 200. A ramp 245 extends to an elevated portion 220 of the base 205 towards the closed portion of the adapter 200. The elevated portion 220 narrows the slot 235 to more securely engage the flange 30 of a coupler 10.

A hole 225 extends through the base 205. The hole 225 aligns with the plug channel 180 when the adapter 200 is installed in the shell 105. The hole 225 is circular in cross section shape and has a diameter that is at least equal to the diameter of the channel 180. The plug 150 extends through the hole 225 when the plug 150 is in a locked position. When the plug 150 is in an unlocked position, the plug 150 does not extend into the hole 225.

A sidewall 210 extends upwardly from the peripheral edge of the base 205. The sidewall 210 generally forms the shape of a U. A flange 215 extends inwardly from the top of the sidewall 210. In a plan view, the flange 215 defines a U-shaped opening that is narrower than the U-shape formed by the sidewall 210. The base 205, sidewall 210 and flange 215 form the slot 225 in which the flange 20 of the coupler 10 is received.

Unlike the adapter 300 of FIGS. 7-8, the adapter 200 of FIGS. 9-10 includes a cover 230 (FIG. 9) that receives and envelops or overlays the receptacle portion 20 of the coupler 10. The cover 230 defines a protective space 250 in which the receptacle portion 20 can be received. Without a cover, the receptacle 20 is exposed. An exposed receptacle is vulnerable to drilling by a thief. After drilling through the receptacle 20, the thief may attempt to dislodge the plug 150 using brute force, such as a sledge hammer and a punch. While any such attempt to dislodge the plug 150 will likely fail due to the interlocking engagement of the plug 150 with the bolt 141, it is best to deter any such attempt by providing a protective cover 230 over the receptacle 20.

The adapter 200 is sized and shaped to fit within a slot 160 of the shell 105. The slot 160 of the shell 105 is sized and shaped to securely receive the adapter 200. The bottom of the base 205 of the adapter 200 abuts the bottom 162 of the cove 115. The top of the flange 215 abuts the overhang 164. The hole 225 aligns with the plug channel 180.

A recess 240 is formed at the front edge of the adapter. The recess 240 is configured to conform with the underlying cell 124 (FIG. 4) of the shell. The base 205 does not extend past the outer edges of the bottom 162 of the cove 115. Without the recess, the base 205 would overhang the cell 124, posing a potential risk to prying. While any such prying effort would likely fail, it is best to eliminate or minimize overhangs that may seem vulnerable to prying.

The adapter 200 may be comprised of a material that is the same as or different from the material of the shell 105. The adapter 200 material may be comprised of a hardened and tempered steel alloy for superior theft protection. The shell may be comprised of a less costly steel or, to save weight, a lower density material such as an aluminum alloy or nonmetallic composites.

Figure 11:
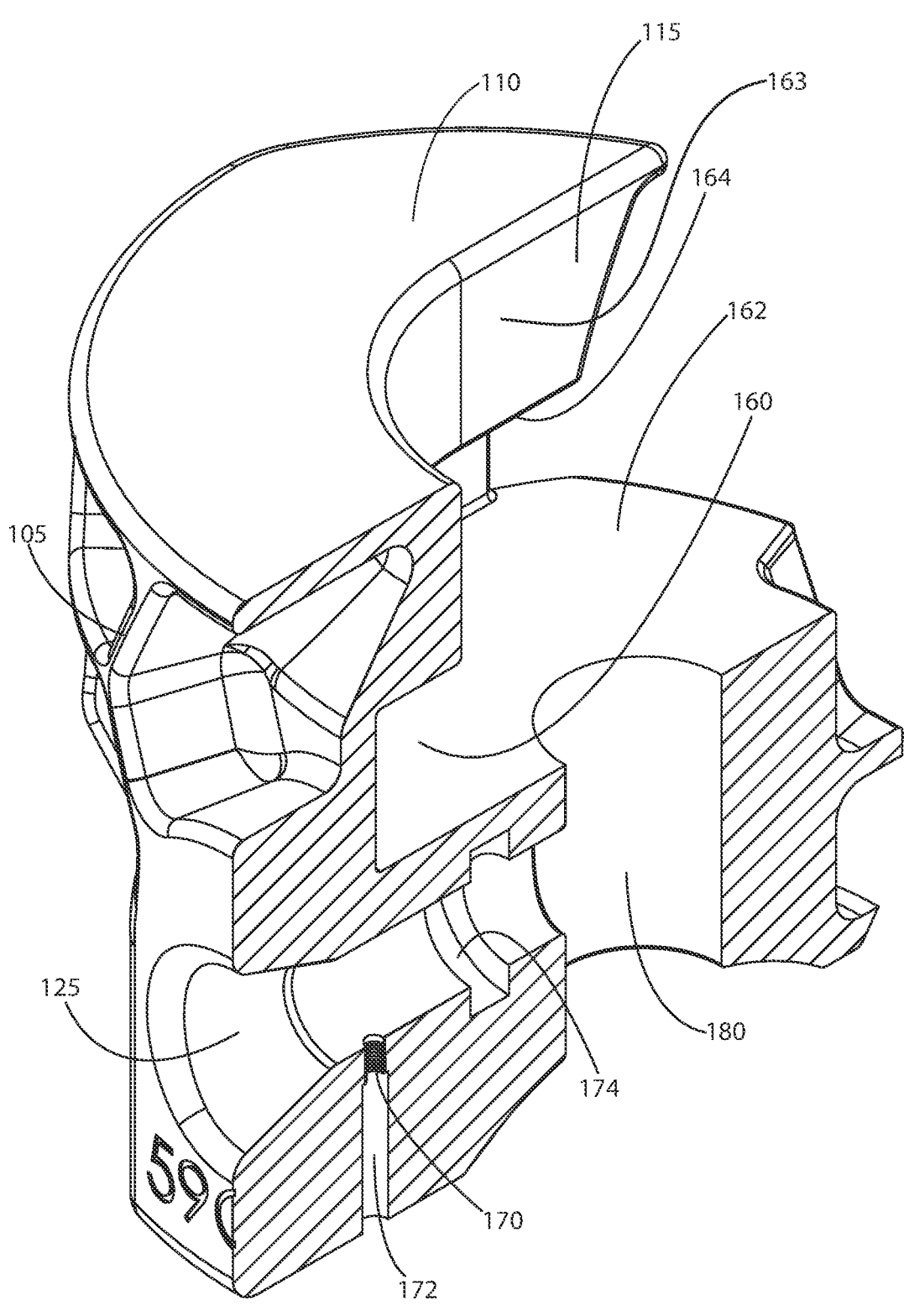
FIG. 11 is a first perspective section view of an exemplary shell for an exemplary coupler lock in accordance with principles of the invention.
Figure 12:
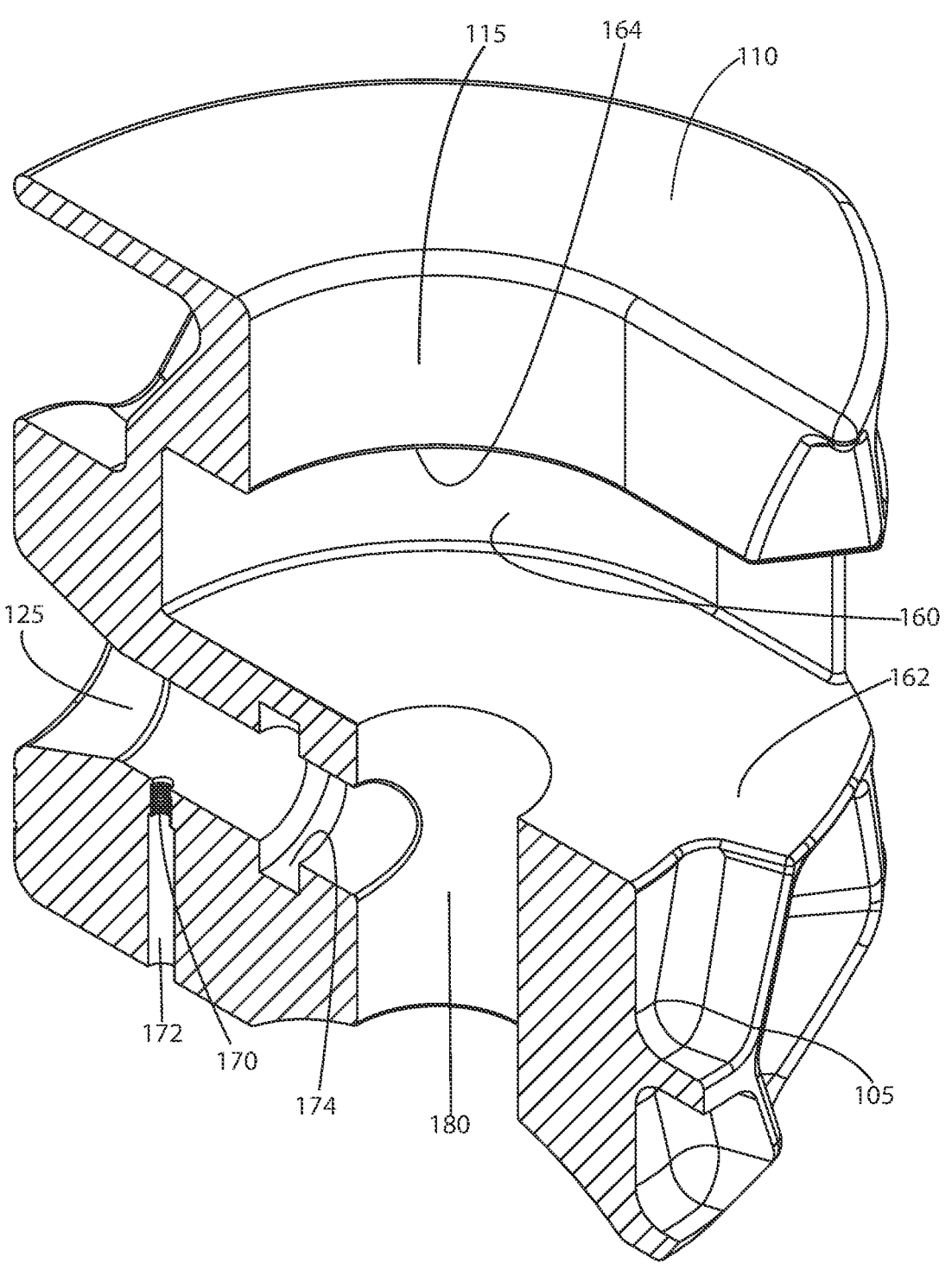
FIG. 12 is a second perspective section view of an exemplary shell for an exemplary coupler lock in accordance with principles of the invention.

FIGS. 11-12 provide perspective section views of an exemplary shell 105 for an exemplary coupler lock 100 in accordance with principles of the invention. The section views reveal functionally significant internal structure that is not plainly evident in external views of the un-sectioned shell 105.

Channel 172 includes threads 171 for receiving a set screw 170. The entire channel 172 may be internally threaded, or, as shown in FIG. 11, the inner end of the channel may be internally threaded. In this embodiment, the set screw may be advanced in the channel up to the threads (e.g., by pushing with the tip of a tool such as an allen wrench). When the sect screw 170 reaches the threads 171, the set screw may be rotated to advance its tip into the narrow peripheral fenestration 145 (e.g., a window or a groove) of the bolt mechanism 140. The fenestration 145 is elongated and located near the open end of the sleeve 143. The length of the fenestration 145 is about equal to or slightly less than the length of the cylindrical bolt 141. The fenestration 145 is aligned with a threaded channel 172. The fenestration 145 with the received set screw 170 define a range of linear motion of the lock assembly within the channel 125.

Annular groove 174 receives the lug 136 when the lock core 135 is in a locked state. The lock core 135 includes the lug 136 that aligns with the window 142 in the sleeve 143. When locked, the lug 136 extends through the window 142 into the annular groove 174. When the lug 136 extends into the annular groove 174, as when the lock core 135 is in a locked state, appreciable linear motion of the lock assembly is prevented. Even if the set screw 170 is removed, the lug 136 remains in the annular groove 174 when the lock core 135 is in a locked state. Rotation of the lock core 135 will not stress the lug 136 because the groove is annular and extends 360 degrees. With the set screw 170 removed, the lock assembly can be rotated 360 degrees without stressing the lug 136. When unlocked, the lug 136 is withdrawn from the annular groove 174 and is about flush with the window 142. In such an unlocked state, the lock core 135 does not resist linear motion of the lock assembly.

The lock channel 125 extends from the front of the shell 105 to the plug channel 180. The intersection of the lock channel 125 and plug channel 180 defines where the cylindrical bolt 141 extends into the compartment 153 of the plug 150, when the lock assembly and plug are in their locked and extended positions. The longitudinal axis of the plug channel 180 is generally (i.e., about) orthogonal to the longitudinal axis of the intersecting lock channel 125. The cylindrical bolt 141 of the bolt mechanism 140 extends into the similarly shaped and sized compartment 153 of the plug 150. The bolt mechanism 140 includes a sleeve 143, which defines a cylindrical compartment 144. In the locked position, the cylindrical bolt 141 extends into the compartment 153 (FIG. 15) of the plug 150. In the unlocked position, the cylindrical bolt 141 is withdrawn from the lock compartment 153 of the plug 150.

The plug 150 moves linearly within the plug channel 180 from an extended position to a retracted position. In the extended position, a portion of the plug 150 extends from the plug channel 180 into the cove 115. In the locked position, the cylindrical bolt 141 of the locking mechanism engages and secures the plug 150 in the extended position. In the unlocked position, the cylindrical bolt 141 of the locking mechanism engages a slot 152 in the plug 150 that allows the plug 150 to descend, under the influence of gravity, to the retracted position. The plug 150 is located, configured, shaped, and sized to extend into the receptacle 20 of a coupler 10, when the plug 150 is in the extended position and the coupler 10 is engaged by the coupler lock 100.

Figure 17:
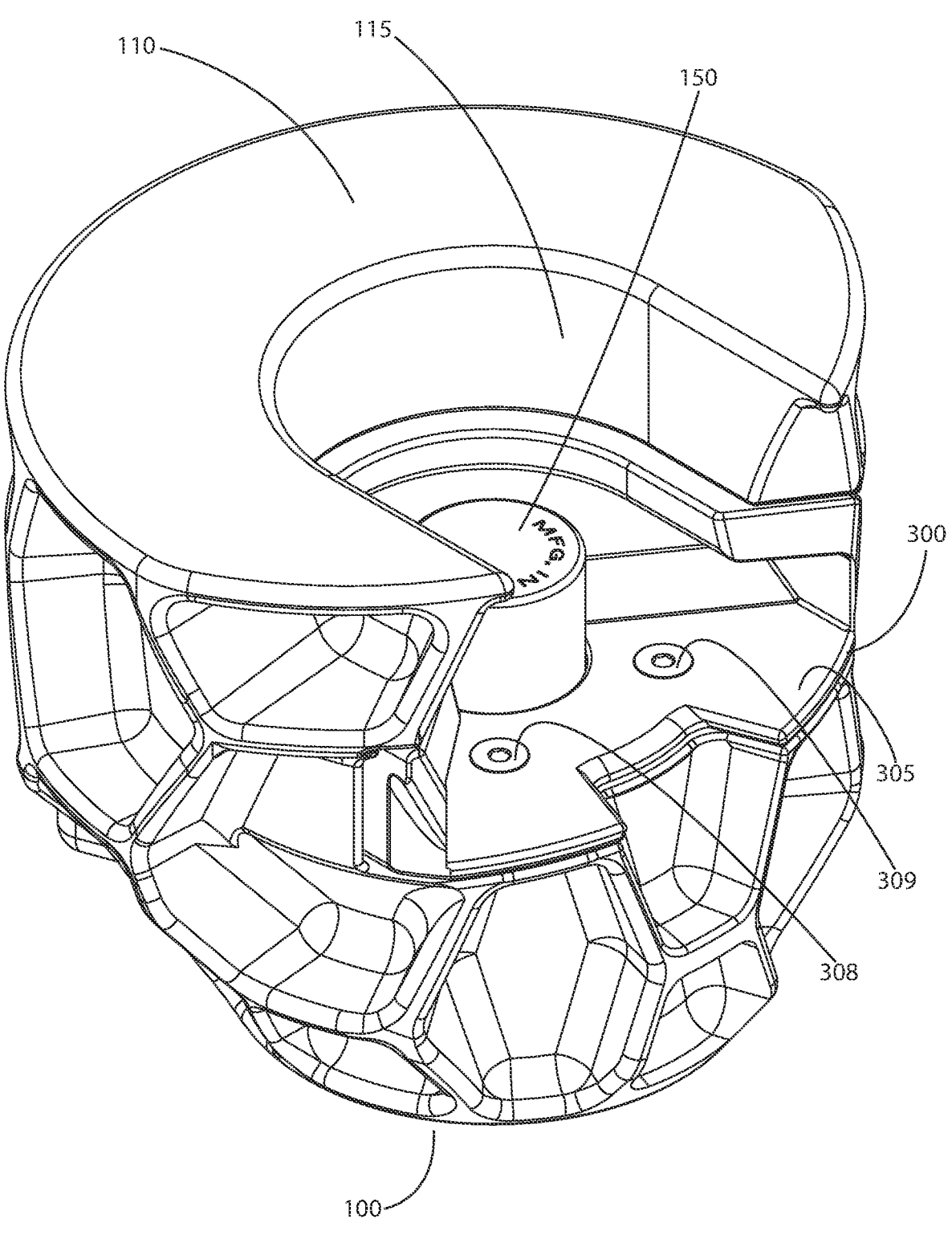
FIG. 17 is a rear perspective view of an exemplary coupler lock with an exemplary interchangeable adapter secured with screws in accordance with principles of the invention.

FIG. 17 is a rear perspective view of an exemplary coupler lock with an exemplary interchangeable adapter secured with screws in accordance with principles of the invention.

Figure 18:
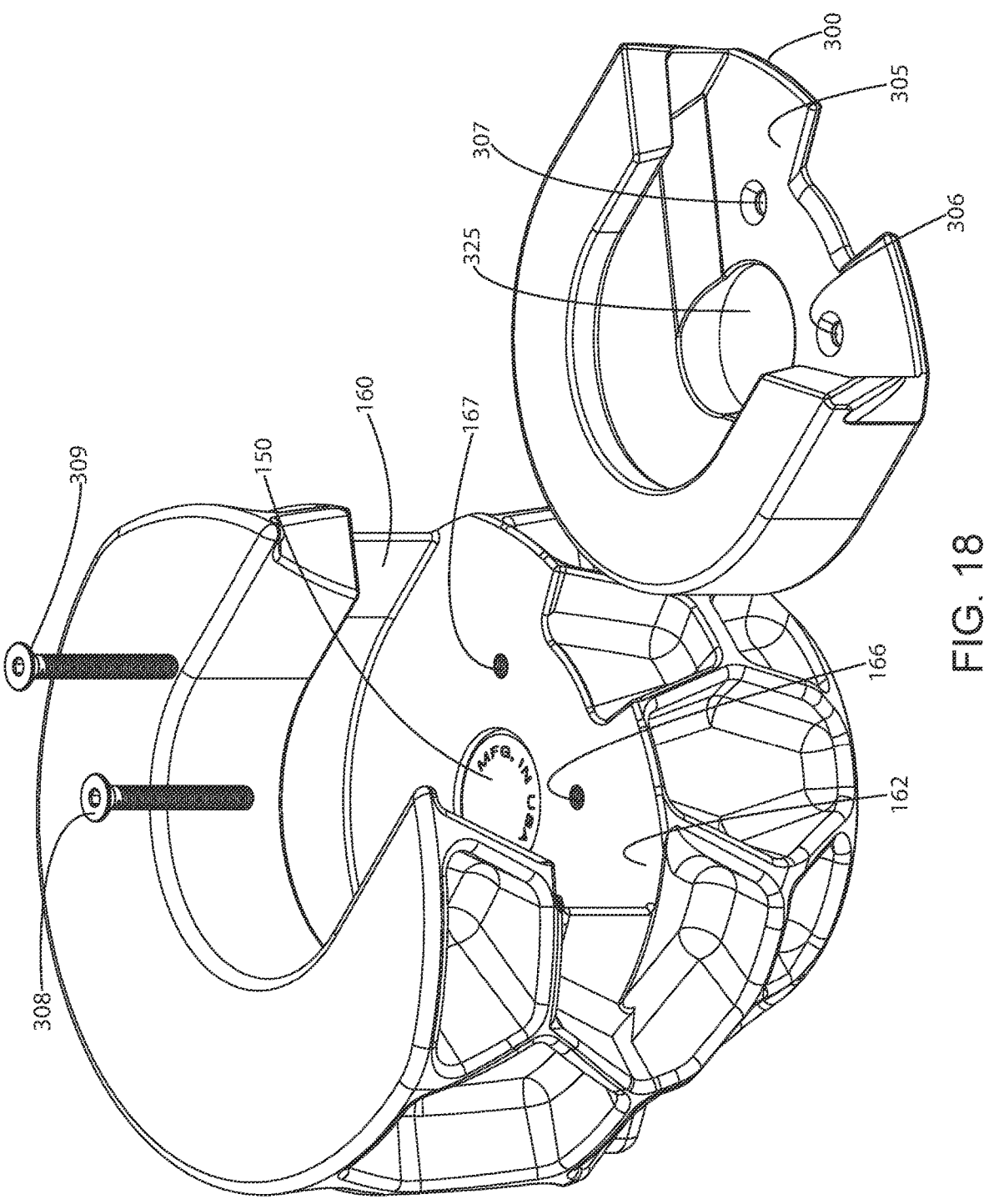
FIG. 18 is a rear perspective view of an exemplary coupler lock with an exemplary interchangeable adapter removed from a mounting slot, a coupler engagement pin in a recessed unlocked position, and screws removed in accordance with principles of the invention.

FIG. 18 is a rear perspective view of an exemplary coupler lock with an exemplary interchangeable adapter removed from a mounting slot, a coupler engagement plug in a recessed unlocked position, and screws removed in accordance with principles of the invention.

An interchangeable adapter, such as but not limited to adapter 200 or adapter 300, may slide into and from the slot 160 in the shell 105. With the coupler lock 100 in the locked state, the plug 150 extends from the plug channel 180 into the cove 115 through the hole 225, 325 in the adapter 200, 300. Thus, when the coupler lock 100 is in the locked state, the plug 150 prevents removal of the adapter 200, 300 from the slot 160 in the shell 105. For additional security, and to prevent separation of the adapter 200, 300 from the shell 105 when the coupler lock 100 is not in a locked state, the adapter 200, 300 may be mechanically secured to the shell using mechanical fasteners, such as pins and/or screws. By way of example and not limitation, FIGS. 17 and 18 conceptually illustrate an embodiment with holes 306, 307 in the base 305 of the adapter 300, which align with threaded holes 166, 167 in the bottom surface 162 of the cove 115, when the adapter is inserted into the slot 160. Screws 308, 309 secure the adapter 300 to the shell 105.

The exterior surface of the cover 230 of the adapter 200 provides a substrate for optional artistic embellishment. By way of example, a design, logo, trademark, or other decorative or informative indicia may be displayed on the cover. A university or team logo may be imprinted, inscribed, painted or otherwise applied to the surface.

An adapter 200, 300 according to principles of the invention includes a slot 235, 335 for engaging the flange 30 of a coupler 10. This means that at least a portion of a coupler flange 30 is contained in the slot 235, 335 when the coupler 10 is engaged by the adapter 200, 300. The slot 235, 335 of the adapter 200, 300 is configured (e.g., sized and shaped) to receive at least a substantial portion of the flange 30 at the receptacle 20 of the coupler 10. In a plan view, such portion of the flange 30 at the receptacle 20 of the coupler 10 is generally U-shaped. Such a slot 235, 335 is a "coupler flange engaging slot." A coupler flange engaging slot is a slot configured (e.g., sized and shaped) to receive at least a substantial portion of the flange 30 at the receptacle 20 of the coupler 10.

Concomitantly, the shell 105 includes a slot 160 configured to receive at least a portion of the base 205, 305, the sidewall 210, 310 and at least a substantial portion of the flange 215, 315 of the adapter 200, 300. When the adapter 200, 300 is received in the slot 160, the base 205, 305 abuts the bottom surface 162 of the cove 115. Such a slot 160 is an "adapter engaging slot." An adapter engaging slot is a slot configured (e.g., sized and shaped) to receive at least a portion of the base 205, 305, the sidewall 210, 310 and at least a substantial portion of the flange 215, 315 of an adapter 200, 300.

Figure 19:
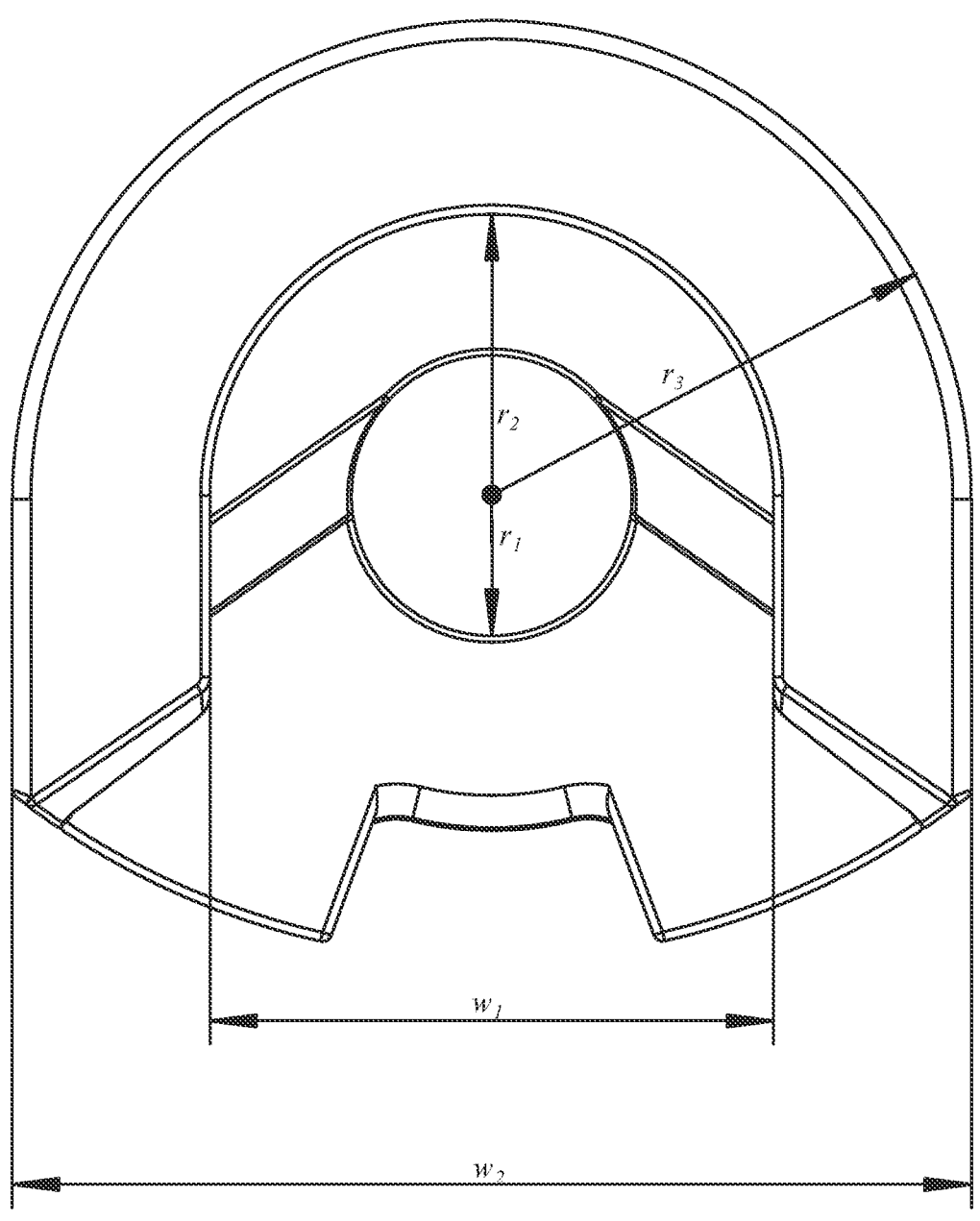
FIG. 19 is a plan view of an exemplary interchangeable adapter with certain dimensions identified in accordance with principles of the invention.
Figure 20:
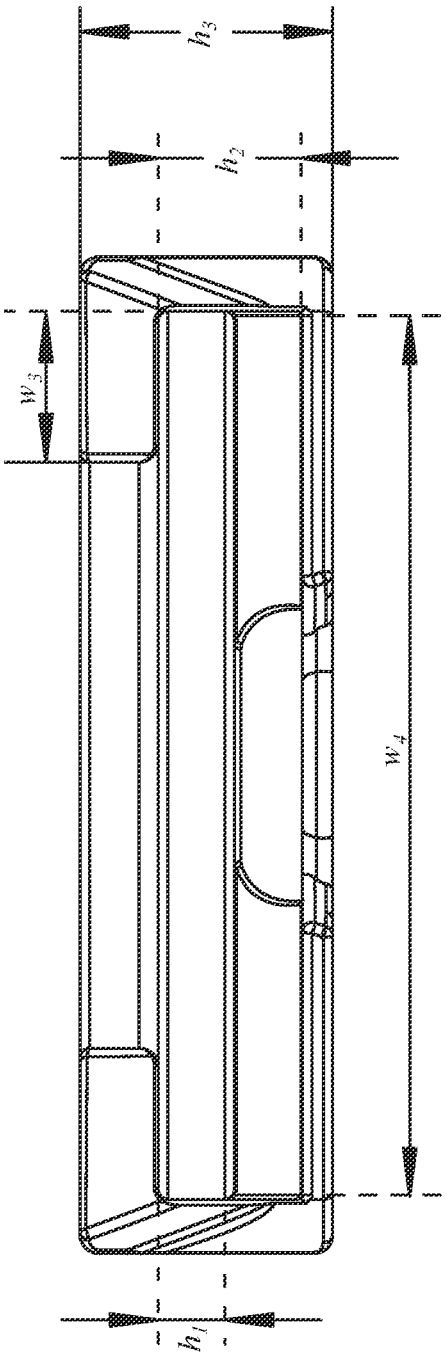
FIG. 20 is a back (rear) view of an exemplary interchangeable adapter with certain dimensions identified in accordance with principles of the invention.
Figure 21:
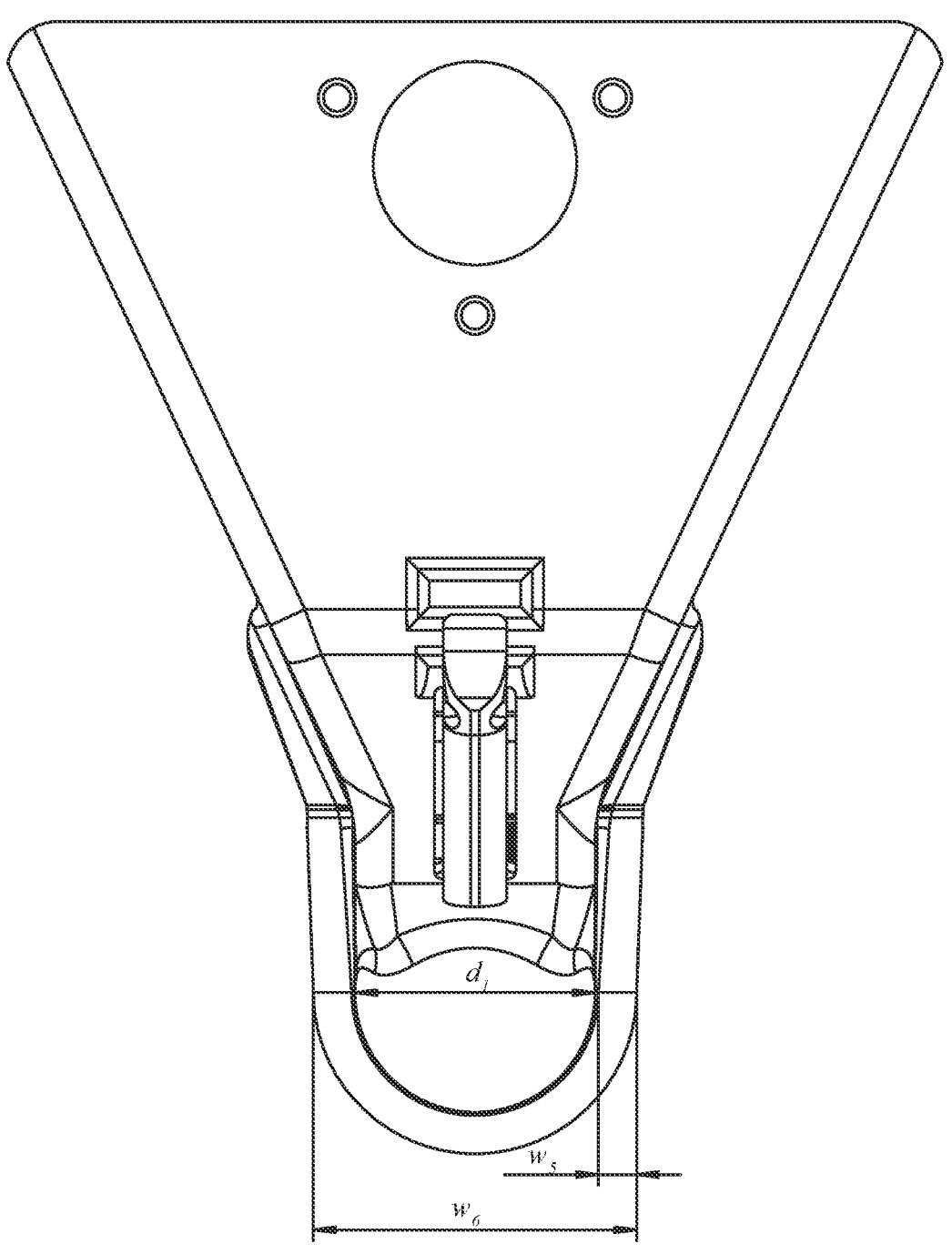
FIG. 21 is a plan view of an exemplary coupler with certain dimensions identified in accordance with principles of the invention.
Figure 22:
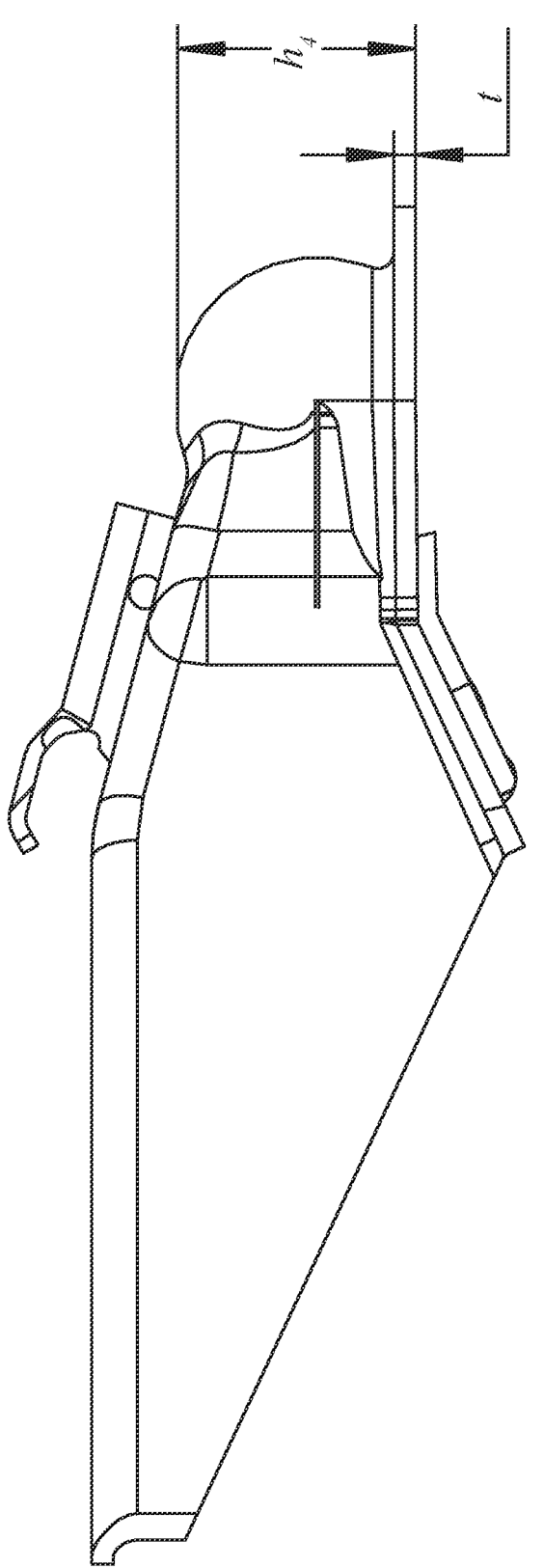
FIG. 22 is a side view of an exemplary coupler with certain dimensions identified in accordance with principles of the invention.

For clarification, FIGS. 19-20 indicate certain dimensions of an exemplary adapter, and FIGS. 21-22 indicate certain dimensions of an exemplary coupler. As shown in FIGS. 21-22, the receptacle of a coupler has an outer diameter $d_1$ that is greater than the diameter of the hitch ball it is configured to receive. While the invention is not limited to any specific ball size, for convenience of reference there are four common ball diameters, 1⅞", 2", 2 5/16" and 3". To provide a socket to receive a 2" diameter ball, the outer diameter of the receptacle may, by way of example and not limitation, be about 2.75". The socket of the receptacle is slightly larger than the ball, to facilitate receiving the ball and allow pivoting movement during towing. Additionally, the material comprising the receptacle has a thickness. A corresponding dimension of the adapter is radius $r_2$, which is the radius from the center of the hole 325 to the edge of the flange 315. The outer diameter $d_1$ of the adapter 300 is less (preferably slightly less) than twice the radius $r_2$. Here, slightly less means less than twice $w_5$, and preferably less than $w_5$. The width $w_1$ between opposed edges of flange 315 exceeds the outer diameter of the receptacle $d_1$, allowing the receptacle portion 20 to reside in the U-shaped opening defined by the flange 315. Thus, the receptacle 20 can fit within the space 330 or 250, while the flange 30 is engaged in the slot 235, 335 of an adapter 200, 300.

The radius $r_1$ of the hole 225, 325 through the base 205, 305 of the adapter 200, 300 exceeds (preferably only slightly exceeds) the radius of the plug 150. The $r_1$ of the hole 225, 325 may equal the radius of the plug channel 180. Additionally, the center of the hole 225, 325 is aligned with the center of the plug channel 180. Thus, the plug 150 may move through the plug channel 180 and hole 225, 325 without appreciable resistance.

The width of the coupler $w_6$ at the receptacle is approximately the sum of the outer diameter of the receptacle $d_1$ and twice the width of the flange $w_5$. The flange width $w_5$ may be approximately ⅜ to ⅝ inch, and more typically 0.4 to 0.5 inches. The slot 235, 335 has a width $w_4$ that is at least equal to, and preferably slightly greater than, the width $w_6$ of the receptacle portion of the coupler. The width $w_3$ of the overhang flange 215, 315 of the adapter may be about equal to or less than the coupler flange width $w_5$, e.g., 50 to 100% of the flange width $w_5$. Thus, the slot 235, 335 of an adapter 200, 300 is configured (i.e., sized and shaped) to receive the receptacle portion of the coupler 10 having the width $w_6$. The width $w_1$ between opposed edges of flange 315 exceeds the outer diameter of the receptacle $d_1$, allowing the receptacle portion 20 to reside in the U-shaped opening defined by the flange 315. However, the width $w_1$ is less than the width $w_6$ of the receptacle portion of the coupler, while the outer width $w_2$ of the adapter is greater than the width $w_6$ of the receptacle portion of the coupler. Likewise, the width $w_6$ of the receptacle portion of the coupler is less than twice the outer radius $r_3$ of the adapter. Concomitantly, the overhang flange 215, 315, extends over the received flange 30 of the receptacle portion of the coupler 10.

The coupler flange 30 has a thickness t. By way of example and not limitation, the thickness t may be from ⅛ inch to ⅜ inch, or from 3/16 inch to 5/16 inch. The height $h_2$ of the adapter from the un-elevated portion of the base 205, 305 to the underside of the flange 215, 315 is less than the height $h_1$ of the adapter from the elevated portion 220, 320 of the base 205, 305 to the underside of the flange 215, 315. Height $h_1$ is greater than thickness t, and preferably only slightly greater, to allow insertion of the coupler flange 30 into the slot 235, 335 without appreciable resistance.

The height $h_4$ of the coupler receptacle 20 is significant for an adapter 200 that includes a cover 230. The cover 230 defines a space 250 that is sufficient to receive the receptacle 20 of the coupler 10. The height $h_4$ of the coupler receptacle 20 is not significant, e.g., not particularly relevant, to an adapter 300 without a cover.

The shell 105 include an adapter engaging slot 160. When the adapter 200, 300 is received in the slot 160, the base 205, 305 abuts the bottom surface 162 of the cove 115. The adapter engaging slot 160 is a slot configured (e.g., sized and shaped) to receive at least a portion of the base 205, 305, the sidewall 210, 310 and at least a substantial portion of the flange 215, 315 of an adapter 200, 300. Thus, the slot 160 is configured to receive an adapter having a height $h_3$, width $w_2$, and radius $r_3$. Thus, the corresponding height, width and radius of the slot 160 are at least equal to, and preferably slightly larger than, the height $h_3$, width $w_2$, and radius $r_3$ of the adapter 200, 300. The cove 115 is wide enough to accommodate a cover 230 and/or a receptacle 20.

Any dimensions are provided as approximate dimensions for an embodiment. Dimensions may be varied without departing from the scope of the invention. Varied dimensions that do not substantially impair utility of the invention come within the spirit and scope of the invention. Subject to the foregoing, unless otherwise specified herein, any claimed dimensions may be varied by at least ±5% without departing from the scope of the invention.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A trailer coupler lock comprising:
   a shell, the shell including a front, a back, a bottom and a top, a cove formed in the back of the shell, the cove comprising a concave recess into which a receptacle portion of a coupler may be received, an adapter engagement slot formed in the back of the shell at the cove, and a first channel extending from the bottom of the shell to the cove; and an adapter removably received in the adapter engagement slot, the adapter including a base with a hole that aligns with the first channel when the adapter is received in the engagement slot, and a coupler flange engagement slot; and a receptacle engaging device, the receptacle engaging device being movable in the first channel from an unlocked position to a locked position, and in the locked position a portion of the receptacle engaging device extending through the hole in the base of the adapter into the cove, and in the unlocked position the receptacle engaging device not extending into the hole in the base of the adapter and not extending into the cove.

2. The trailer coupler lock of claim 1, the cove including a sidewall, and the adapter engagement slot comprising a first groove formed in the sidewall of the cove, the first groove being configured to engage at least a portion of the adapter at a periphery of the adapter.

3. The trailer coupler lock of claim 2, the cove including a bottom surface, and the base of the adapter abutting the bottom surface of the cove when the adapter is received in the adapter engagement slot.

4. The trailer coupler lock of claim 3, a mechanical fastener securing the base of the adapter to the bottom of the cove.

5. The trailer coupler lock of claim 3, the base of the adapter including a front portion, a rear portion and a pair of spaced apart edges extending from the front portion to the rear portion, and the adapter further comprising a sidewall extending from the front portion and the pair of spaced apart edges, and a flange extending orthogonally from the sidewall, and the flange, sidewall and base of the adapter defining the coupler flange engagement slot.

6. The trailer coupler lock of claim 5, the front portion of the adapter being arch-shaped.

7. The trailer coupler lock of claim 5, a distance from the flange and base of the adapter being at least equal to a thickness of a coupler flange.

8. The trailer coupler lock of claim 5, the base of the adapter including an elevated portion adjacent to the front portion of the base of the adapter, an unelevated portion adjacent to the back portion of the base of the adapter, and a ramp portion transitioning from the unelevated portion to the elevated portion, and a distance from the flange and the elevated portion of the base of the adapter being at least equal to a thickness of a coupler flange.

9. The trailer coupler lock of claim 1, the first channel having a first diameter, and the hole in the base of the adapter having a diameter that is at least equal to the first diameter.

10. The trailer coupler lock of claim 9, the first channel and the hole in the base of the adapter being concentrically aligned.

11. The trailer coupler lock of claim 1, the shell being comprised of a first material and the adapter being comprised of a second material, the second material being different from the first material.

12. The trailer coupler lock of claim 11, a density of the second material being greater than a density of the first material.

13. The trailer coupler lock of claim 11, a hardness of the second material being greater than a hardness of the first material.

14. The trailer coupler lock of claim 1, the receptacle engaging device comprising a plug having a cylindrical body with an elongated slot formed in a sidewall of the cylindrical body, a longitudinal axis of the cylindrical body being parallel to a longitudinal axis of the slot.

15. The trailer coupler lock of claim 14, the elongated slot of the cylindrical body including a top end and a bottom end, and a cavity formed in the elongated slot of the cylindrical body at the bottom end of the elongated slot of the cylindrical body.

16. The trailer coupler lock of claim 15, a lock channel extending from the front of the shell to the first channel.

17. The trailer coupler lock of claim 16, a lock assembly movable in the lock channel from an unlocked configuration to a locked configuration, and in the locked configuration, a portion of the lock assembly engaging the cavity formed in the elongated slot of the cylindrical body at the bottom end of the elongated slot of the cylindrical body and retaining the receptacle engaging device in the locked position.

18. The trailer coupler lock of claim 17, in the unlocked configuration the portion of the lock assembly engaging the elongated slot of the cylindrical body without engaging the cavity formed in the elongated slot of the cylindrical body at the bottom end of the elongated slot, and the receptacle engaging device being movable relative to the first channel.

19. The trailer coupler lock of claim 18, further comprising an annular groove intersecting the lock channel, and the lock assembly including a lug movable from a recessed position to an extended position and in the extended position the lug extending into the annular groove, and in the recessed position the lug not extending into the annular groove.

20. The trailer coupler lock of claim 1, the shell including an exterior surface, a plurality of hexagonal prism bosses formed in the exterior surface, and a distance between opposite corners of each hexagonal prism boss not exceeding 3 inches.

* * * * *